US011581929B2

(12) United States Patent
Guo et al.

(10) Patent No.: US 11,581,929 B2
(45) Date of Patent: Feb. 14, 2023

(54) METHOD AND APPARATUS FOR BEAM MANAGEMENT

(71) Applicant: Samsung Electronics Co., Ltd., Suwon-si (KR)

(72) Inventors: Li Guo, Allen, TX (US); Eko Onggosanusi, Coppell, TX (US); Md. Saifur Rahman, Plano, TX (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/793,939

(22) Filed: Feb. 18, 2020

(65) Prior Publication Data

US 2020/0212981 A1 Jul. 2, 2020

Related U.S. Application Data

(63) Continuation of application No. 15/887,872, filed on Feb. 2, 2018, now Pat. No. 10,567,058.
(Continued)

(51) Int. Cl.
*H04B 7/06* (2006.01)
*H04W 24/10* (2009.01)
(Continued)

(52) U.S. Cl.
CPC ......... *H04B 7/0626* (2013.01); *H04B 7/0695* (2013.01); *H04L 5/0053* (2013.01);
(Continued)

(58) Field of Classification Search
CPC ... H04B 7/0626; H04B 7/0695; H04L 5/0053; H04L 5/0092; H04L 25/0224; H04L 27/18; H04L 5/0048; H04W 24/10
See application file for complete search history.

(56) References Cited

U.S. PATENT DOCUMENTS 9,713,026 B2 * 7/2017 Gaal ..................... H04L 1/0026
10,455,608 B2 * 10/2019 Shepard ............ H04W 72/0446
(Continued)

FOREIGN PATENT DOCUMENTS

CN 104081813 A 10/2014
CN 105122869 A 12/2015
(Continued)

OTHER PUBLICATIONS

Intellectual Property—India, Examination Report dated Jan. 5, 2022 regarding Application No. 201947031283, 5 pages.
(Continued)

*Primary Examiner* — Saumit Shah

(57) ABSTRACT

Beam measurement and reporting by a user equipment (UE) includes receiving configuration information for a channel state information (CSI) framework from a base station (BS) and identifying reporting settings and resource settings configured for the UE based on the received configuration information. The reporting settings configure a beam measurement and reporting configuration. The resource settings configure one or more reference signal (RS) resources for beam measurement. Each of the RS resources represents a transmit (Tx) beam. The method further includes performing beam measurement based on the identified reporting and resource settings, generating a CSI report based on the identified reporting and resource settings, and transmitting the generated CSI report to the BS.

16 Claims, 23 Drawing Sheets

Related U.S. Application Data

(60) Provisional application No. 62/456,434, filed on Feb. 8, 2017, provisional application No. 62/464,801, filed on Feb. 28, 2017, provisional application No. 62/472,865, filed on Mar. 17, 2017, provisional application No. 62/554,311, filed on Sep. 5, 2017, provisional application No. 62/562,749, filed on Sep. 25, 2017, provisional application No. 62/587,193, filed on Nov. 16, 2017.

(51) Int. Cl.
*H04L 5/00* (2006.01)
*H04L 25/02* (2006.01)
*H04L 27/18* (2006.01)

(52) U.S. Cl.
CPC .......... *H04L 5/0092* (2013.01); *H04W 24/10* (2013.01); *H04L 5/0048* (2013.01); *H04L 25/0224* (2013.01); *H04L 27/18* (2013.01)

(56) References Cited

U.S. PATENT DOCUMENTS

| | | | |
|---|---|---|---|
| 2013/0196675 A1 | 8/2013 | Xiao et al. | |
| 2014/0010126 A1* | 1/2014 | Sayana | H04B 7/0626 370/280 |
| 2015/0215022 A1* | 7/2015 | Nagata | H04L 5/0048 370/329 |
| 2015/0341099 A1 | 11/2015 | Kang et al. | |
| 2016/0323075 A1* | 11/2016 | Jeong | H04L 5/0032 |
| 2016/0359531 A1* | 12/2016 | Suh | H04B 7/0665 |
| 2017/0048037 A1* | 2/2017 | Yen | H04B 7/0695 |
| 2017/0195998 A1 | 7/2017 | Zhang et al. | |
| 2018/0034531 A1* | 2/2018 | Sadiq | H04W 72/046 |
| 2018/0227786 A1* | 8/2018 | Yu | H04W 24/10 |
| 2018/0269945 A1* | 9/2018 | Zhang | H04B 7/0632 |
| 2021/0119686 A1* | 4/2021 | Tang | H04B 7/0695 |

FOREIGN PATENT DOCUMENTS

| | | |
|---|---|---|
| CN | 105830483 A | 8/2016 |
| WO | 2017014572 A1 | 1/2017 |

OTHER PUBLICATIONS

Chinese National Intellectual Property AdminisliaLion, First Office Action dated Jul. 18, 2022 regarding Application No. 201880011065.2, 11 pages.

Huawei et al., "Discussion on downlink beam measurement and UE reporting procedure", 3GPP TSG RAN WG1 NR Ad hoc Meeting, R1-1700039, Jan. 2017, 10 pages.

Korean Intellectual Property Office, Decision to Grant issued Oct. 5, 2022 regarding Application No. 10-2019-7026226, 5 pages.

Samsung, "CSI-RS for beam management", 3GPP TSG RAN WG1#88, R1-17002955, Feb. 2017, 5 pages.

Huawei et al., "Enhanced CRI reporting for NR MIMO", 3GPP TSG RAN WG1 Meeting #88, R1-1701717, Feb. 2017, 3 pages.

* cited by examiner

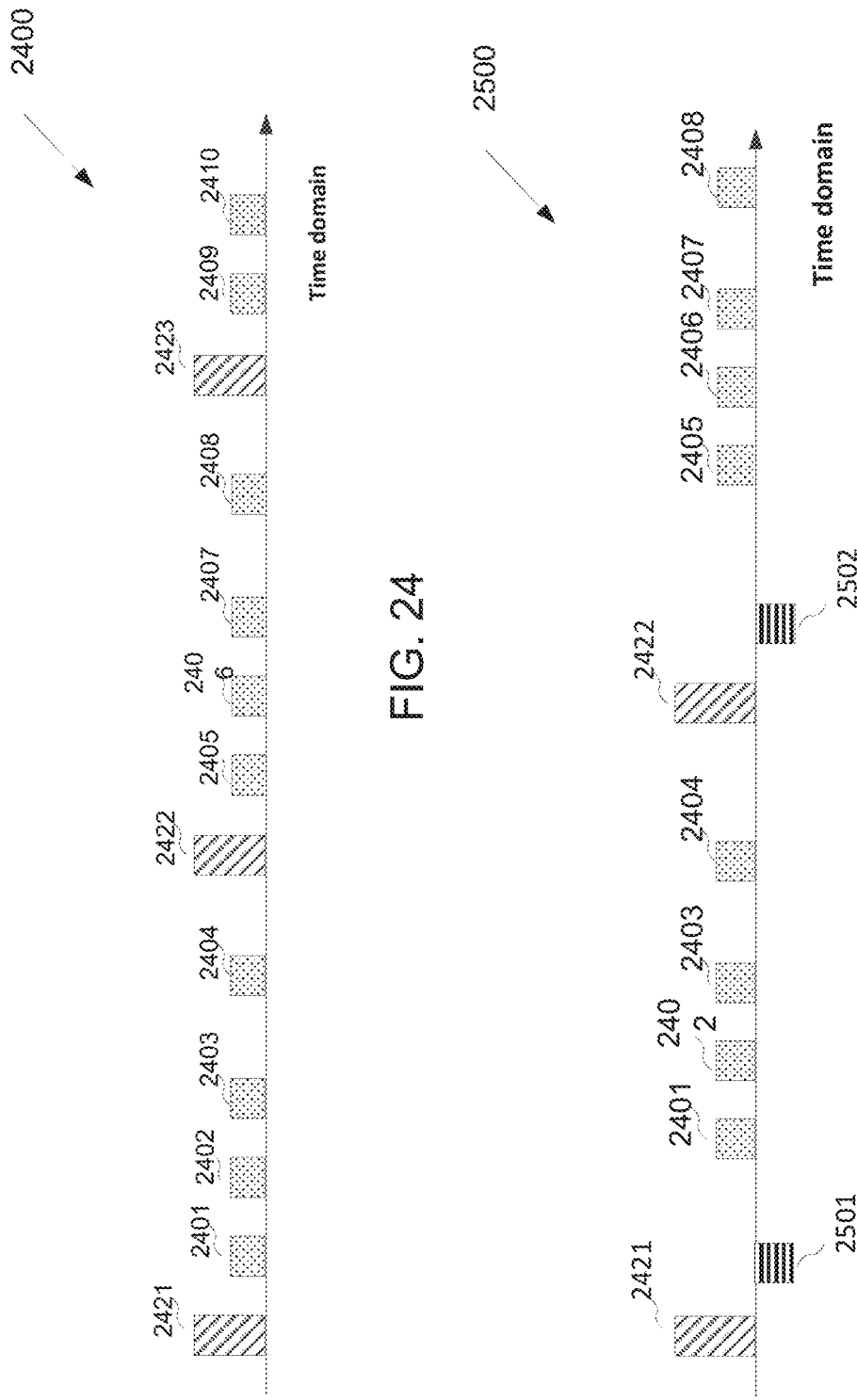

METHOD AND APPARATUS FOR BEAM MANAGEMENT

CROSS-REFERENCE TO RELATED APPLICATION(S) AND CLAIM OF PRIORITY

This application is a continuation of U.S. Non-Provisional patent application Ser. No. 15/887,872 filed on Feb. 2, 2018, and claims priority to: U.S. Provisional Patent Application No. 62/456,434 filed on Feb. 8, 2017; U.S. Provisional Patent Application No. 62/464,801 filed on Feb. 28, 2017; U.S. Provisional Patent Application No. 62/472,865 filed on Mar. 17, 2017; U.S. Provisional Patent Application No. 62/554,311 filed on Sep. 5, 2017; U.S. Provisional Patent Application No. 62/562,749 filed on Sep. 25, 2017; and U.S. Provisional Patent Application No. 62/587,193 filed on Nov. 16, 2017. The content of the above-identified patent documents is incorporated herein by reference.

TECHNICAL FIELD

The present application relates generally to beam management. More specifically, this disclosure relates to new radio (NR) physical downlink control channel (PDCCH) and beam management in an advanced wireless communication system.

BACKGROUND

In a wireless communication network, a network access and a radio resource management (RRM) are enabled by physical layer synchronization signals and higher (MAC) layer procedures. In particular, a user equipment (UE) attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra-reliable low latency (URLLC), massive machine type communication (mMTC), each corresponding to a different coverage requirement and frequency bands with different propagation losses is desirable. Most likely designed with a different network and radio resource paradigm, seamless and low-latency RRM is also desirable.

SUMMARY

Embodiments of the present disclosure provide NR PDCCH and beam management in an advanced wireless communication system.

In one embodiment, a UE for beam measurement and reporting is provided. The UE includes a transceiver configured to receive configuration information for a channel state information (CSI) framework from a base station (BS) and a processor operably connected to the transceiver. The processor is configured to identify reporting settings and resource settings configured for the UE based on the received configuration information. The reporting settings configure a beam measurement and reporting configuration, the resource settings configure one or more reference signal (RS) resources for beam measurement, and each of the RS resources represents a transmit (Tx) beam. The processor is further configured to perform beam measurement based on the identified reporting and resource settings and generate a CSI report based on the identified reporting and resource settings. The transceiver is further configured to transmit the generated CSI report to the BS.

In another embodiment, a BS for configuring beam measurement and reporting is provided. The BS includes a processor configured to generate configuration information for a CSI framework and a transceiver operably connected to the processor. The configuration information includes reporting settings and resource settings configured for a UE. The reporting settings configure a beam measurement and reporting configuration, the resource settings configure one or more RS resources for beam measurement, and each of the RS resources represents a Tx beam. The transceiver is configured to transmit the configuration information to the UE for the beam measurement and reporting and receive, from the UE, a CSI report generated based on the configured reporting and resource settings.

In yet another embodiment, A method for beam measurement and reporting by a UE is provided. The method includes receiving configuration information for a CSI framework from a BS and identifying reporting settings and resource settings configured for the UE based on the received configuration information. The reporting settings configure a beam measurement and reporting configuration. The resource settings configure one or more RS resources for beam measurement. Each of the RS resources represents a Tx beam. The method further includes performing beam measurement based on the identified reporting and resource settings, generating a CSI report based on the identified reporting and resource settings, and transmitting the generated CSI report to the BS.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 24 illustrates another example concurrent beam management and CSI acquisition according to embodiments of the present disclosure;

FIG. 25 illustrates yet another example concurrent beam management and CSI acquisition according to embodiments of the present disclosure;

DETAILED DESCRIPTION

FIG. 1 through FIG. 28, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v14.1.0, "E-UTRA, Physical channels and modulation;" 3GPP TS 36.212 v14.1.0, "E-UTRA, Multiplexing and Channel coding;" 3GPP TS 36.213 v14.1.0, "E-UTRA, Physical Layer Procedures;" 3GPP TS 36.321 v14.1.0, "E-UTRA, Medium Access Control (MAC) protocol specification;" and 3GPP TS 36.331 v14.1.0, "E-UTRA, Radio Resource Control (RRC) protocol specification," 3GPP TR 22.891 v1.2.0, "Feasibility Study on New Services and Markets Technology Enablers;" and 3GPP TR 38.802 v.14.2.0, "Study on new radio access technology Physical layer aspects."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
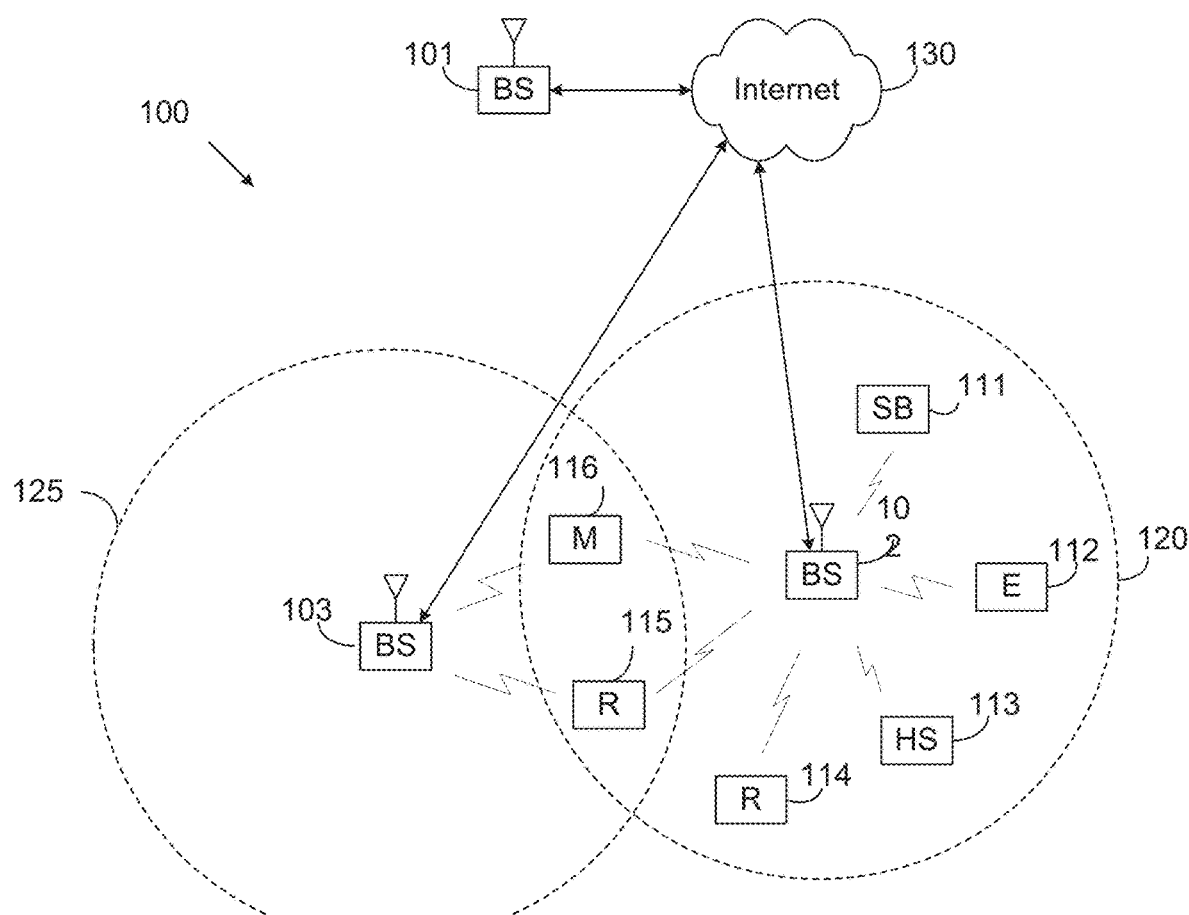
FIG. 1 illustrates an example wireless network according to embodiments of the present disclosure.
Figure 2:
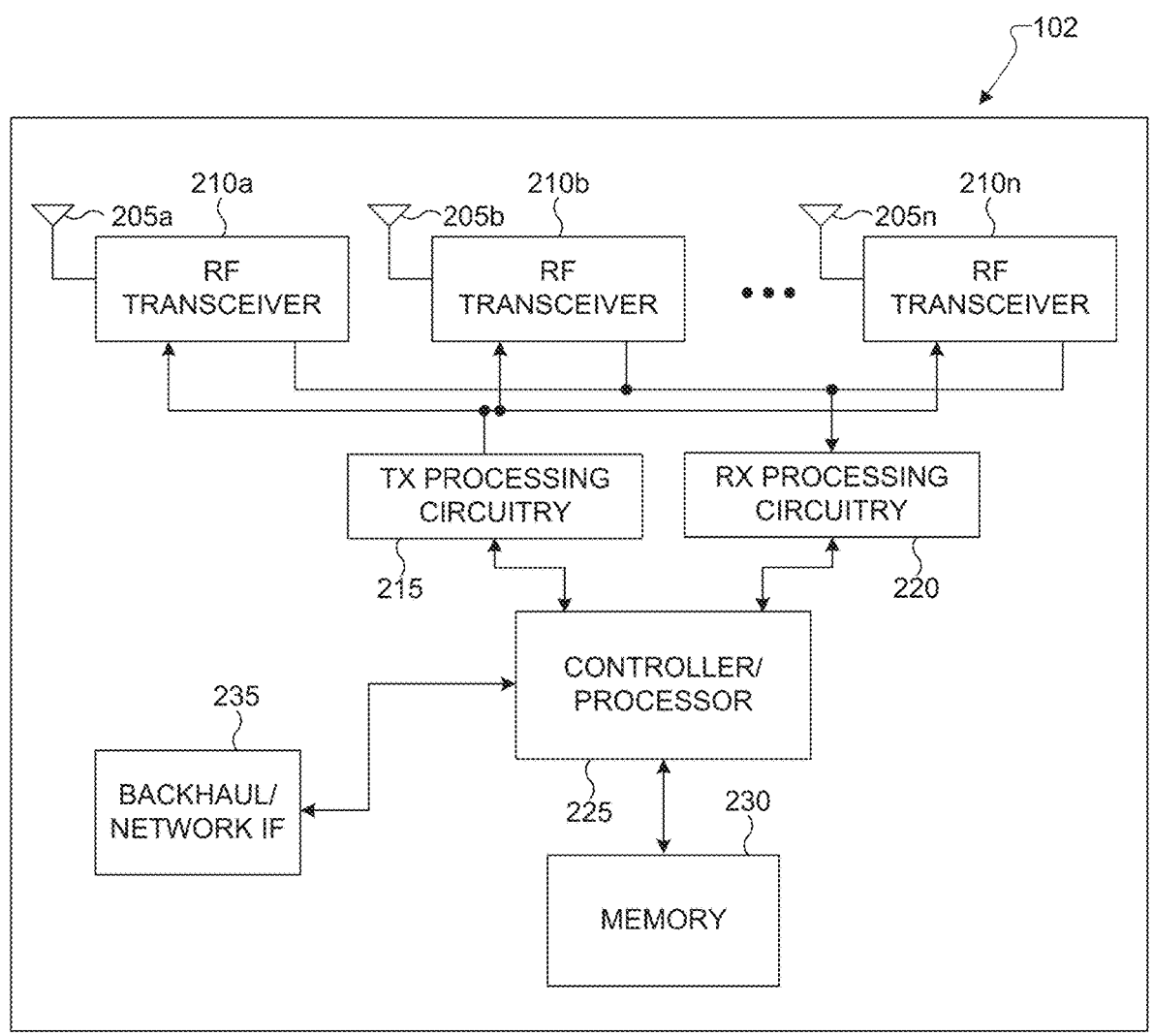
FIG. 2 illustrates an example eNB according to embodiments of the present disclosure.
Figure 3:
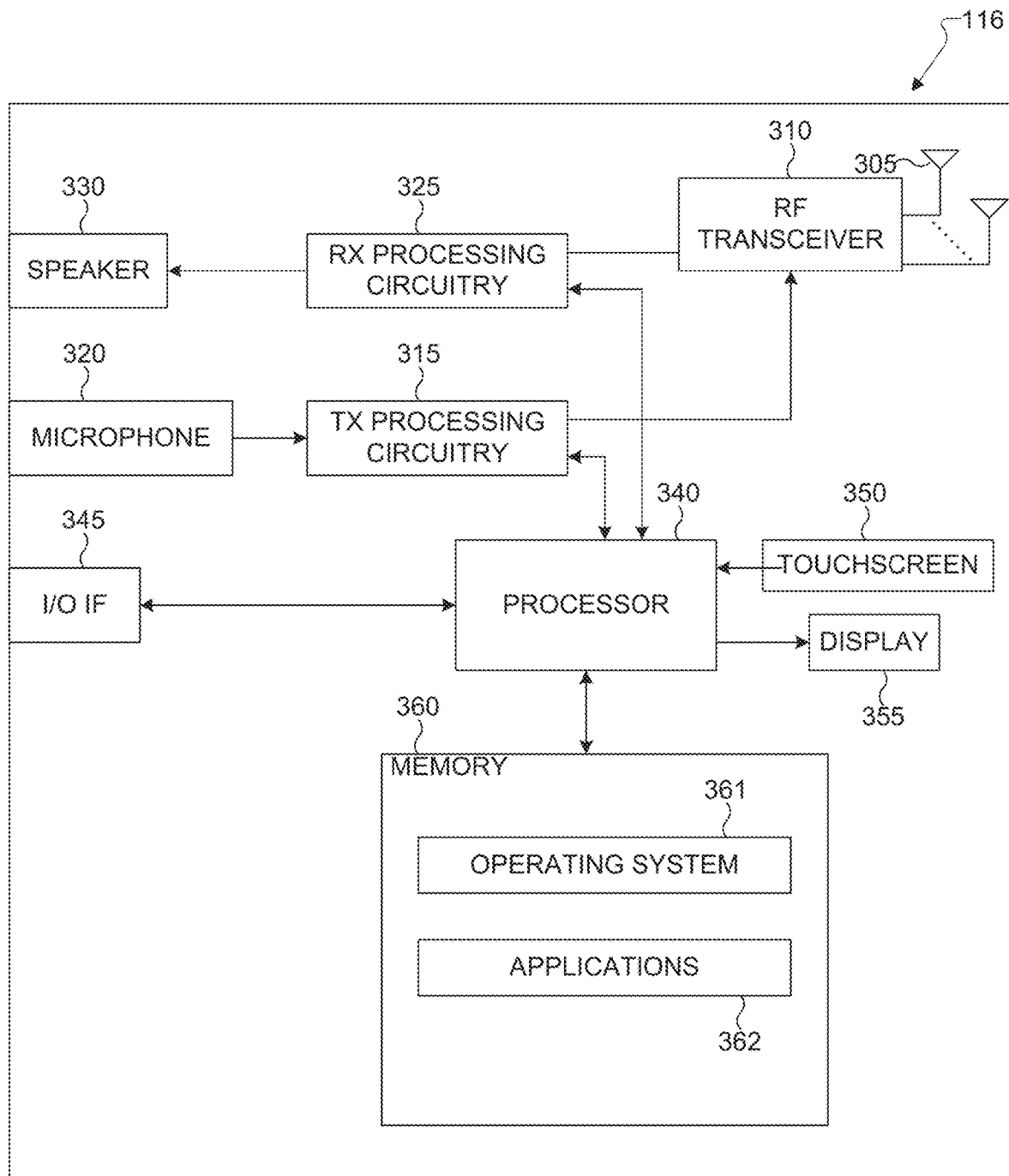
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient beam management in an advanced wireless communication system. In certain embodiments, and one or more of the eNBs 101-103 includes circuitry, programming, or a combination thereof, for receiving efficient beam management in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX)

processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceiver 210a-201n is capable of transmitting the PSS and SSS over downlink channels.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is capable of generating a primary synchronization signal (PSS) including one of multiple PSS sequences that is generated based on a binary phase shift keying (BPSK) modulated length-127 M-sequence in a frequency domain, wherein the PSS includes part of cell identification (ID) information.

In some embodiments, the controller/processor 225 is capable of generating a secondary synchronization signal (SSS) including one of multiple SSS sequences that is generated based on multiple BPSK modulated length-127 M-sequences in the frequency domain, wherein the SSS includes the cell identification (ID) information.

In some embodiments, the controller/processor 225 is capable of determining a number of PSS sequences corresponding to a number of cell ID hypotheses carried by PSS, respectively and a number of SSS sequences corresponding to the number of cell ID hypotheses carried by the PSS and SSS, respectively.

In some embodiments, the controller/processor 225 is capable of determining a polynomial for an M-sequence generating the PSS sequence and a cyclic shift for the M-sequence based on the cell ID information carried by PSS, and generating the PSS sequence by performing the cyclic shift to the M-sequence for a cell ID.

In some embodiments, the controller/processor 225 is capable of determining a polynomial for a first M-sequence generating the SSS sequence, a first cyclic shift for the first M-sequence based on the cell ID information carried by PSS and SSS, the polynomial for a second M-sequence generating the SSS sequence, a second cyclic shift for the second M-sequence based on the cell ID information carried by PSS and SSS, and generating the SSS sequence by performing a product of the first and second M-sequences, wherein each of the first and second M-sequences is generated by the first and second cyclic shifts, respectively, for the cell ID.

In such embodiments, the polynomial for the M-sequence is given by $x^7+x^4+1$ and a corresponding recursive construction scheme is given by $d_M(i+7)=[d_M(i+4)+d_M(i)] \bmod 2$, $0 \le i \le 119$, the polynomial for the first M-sequence is given by $x^7+x^4+1$ and a corresponding recursive construction scheme is given by $d_M(i+7)=[d_M(i+4)+d_M(i)] \bmod 2$, $0 \le i \le 119$, and the polynomial for the second M-sequence is given by $x^7+x+1$ and a corresponding recursive construction scheme is given by $d_M(i+7)=[d_M(i+1)+d_M(i)] \bmod 2$, $0 \le i \le 119$.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving a primary synchronization signal (PSS) and a secondary synchronization signal (SSS) over downlink channels.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

In some embodiments, the processor 340 is capable of determining the PSS including one of multiple PSS sequences that is generated based on a binary phase shift keying (BPSK) modulated length-127 M-sequence in a frequency domain, wherein the PSS includes part of cell identification (ID) information and the SSS including one of multiple SSS sequences that is generated based on multiple BPSK modulated length-127 M-sequences in the frequency domain, wherein the SSS includes the cell identification (ID) information.

In some embodiments, the processor 340 is capable of determining a number of PSS sequences corresponding to a number of cell ID hypotheses carried by PSS, respectively; and a number of SSS sequences corresponding to the number of cell ID hypotheses carried by the PSS and SSS, respectively.

In some embodiments, the processor 340 is capable of determining a polynomial for an M-sequence generating the PSS sequence, a cyclic shift for the M-sequence based on the cell ID information carried by PSS, and generating the PSS sequence by performing the cyclic shift to the M-sequence for a cell ID.

In some embodiments, the processor 340 is capable of determining a polynomial for a first M-sequence generating the SSS sequence, a first cyclic shift for the first M-sequence based on the cell ID information carried by PSS and SSS, the polynomial for a second M-sequence generating the SSS sequence, a second cyclic shift for the second M-sequence based on the cell ID information carried by PSS and SSS, and generating the SSS sequence by performing a product of the first and second M-sequences, wherein each of the first and second M-sequences is generated by the first and second cyclic shifts, respectively, for the cell ID.

In such embodiments, the polynomial for the M-sequence is given by $x^7+x^4+1$ and a corresponding recursive construction scheme is given by $d_M(i+7)=[d_M(i+4)+d_M(i)] \mod 2$, $0 \le i \le 119$, the polynomial for the first M-sequence is given by $x^7+x^4+1$ and a corresponding recursive construction scheme is given by $d_M(i+7)=[d_M(i+4)+d_M(i)] \mod 2$, $0 \le i \le 119$, and the polynomial for the second M-sequence is given by $x^7+x+1$ and a corresponding recursive construction scheme is given by $d_M(i+7)=[d_M(i+1)+d_M(i)] \mod 2$, $0 \le i \le 119$.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
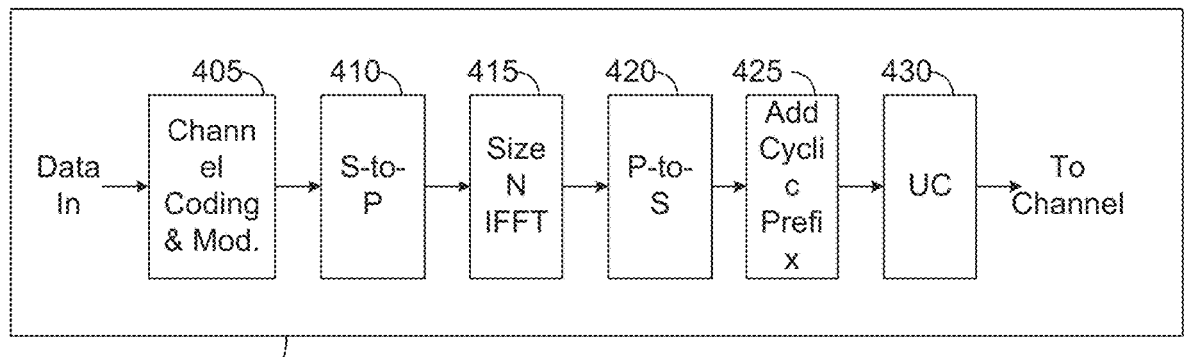
FIG. 4A illustrates a high-level diagram of an orthogonal frequency division multiple access transmit path according to embodiments of the present disclosure.
Figure 4B:
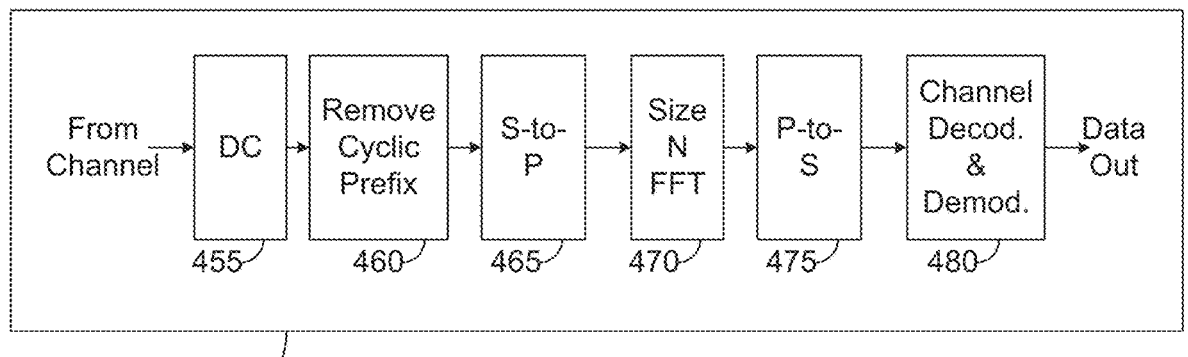
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a Downlink (DL) that conveys signals from transmission points such as Base Stations (BSs) or NodeBs to User Equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the BCCH conveys a master information block (MIB) or to a DL shared channel (DL-SCH) when the BCCH conveys a system information block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1) - N_{SRS}$, where $N_{SRS}=1$ if a last subframe symbol is used to transmit SRS and $N_{SRS}=0$ otherwise.

Figure 5:
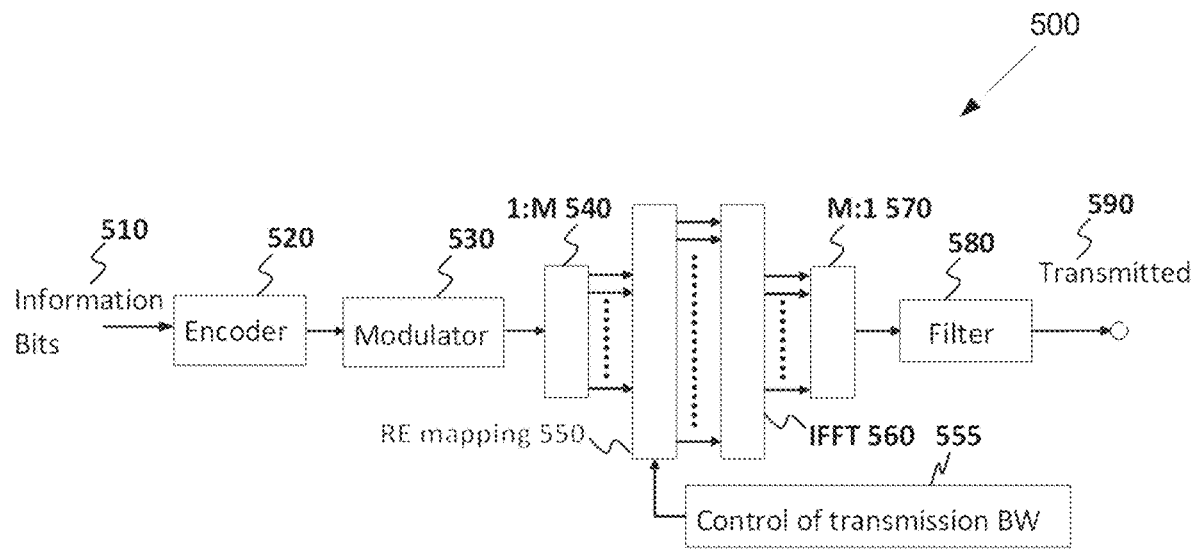
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
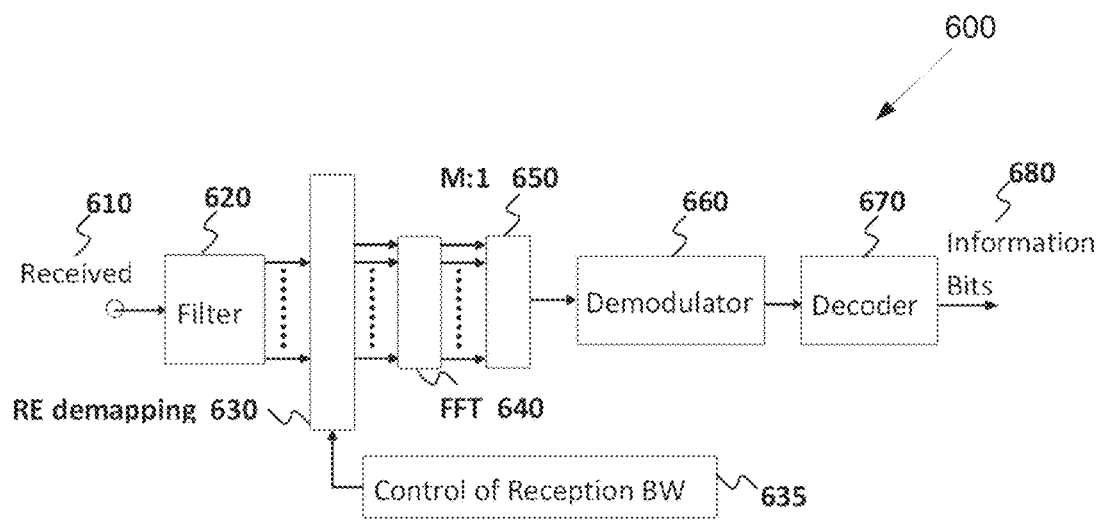
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
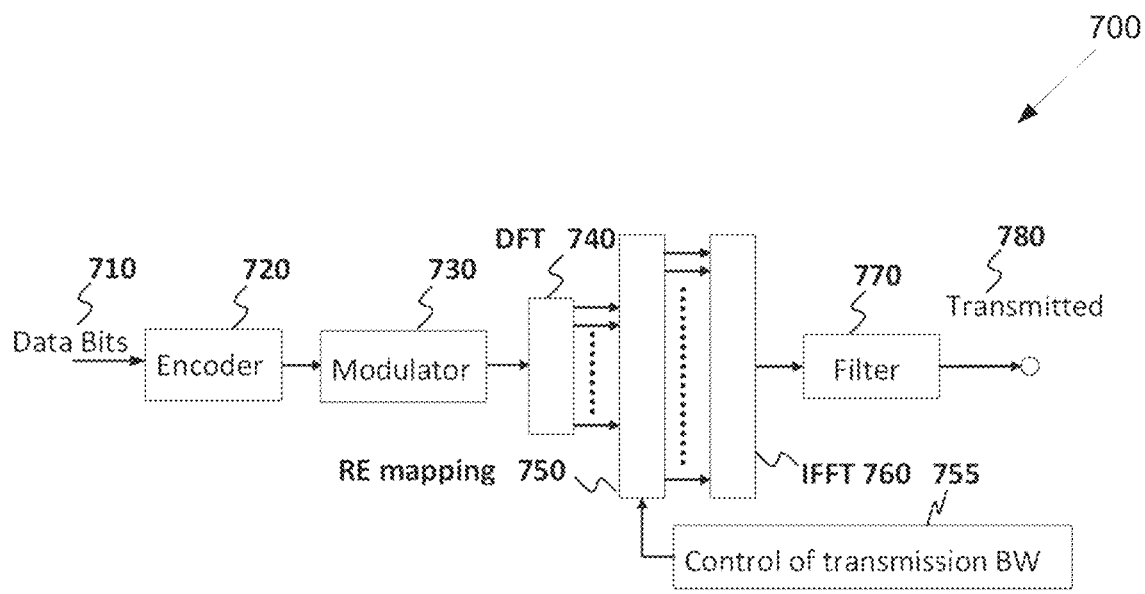
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
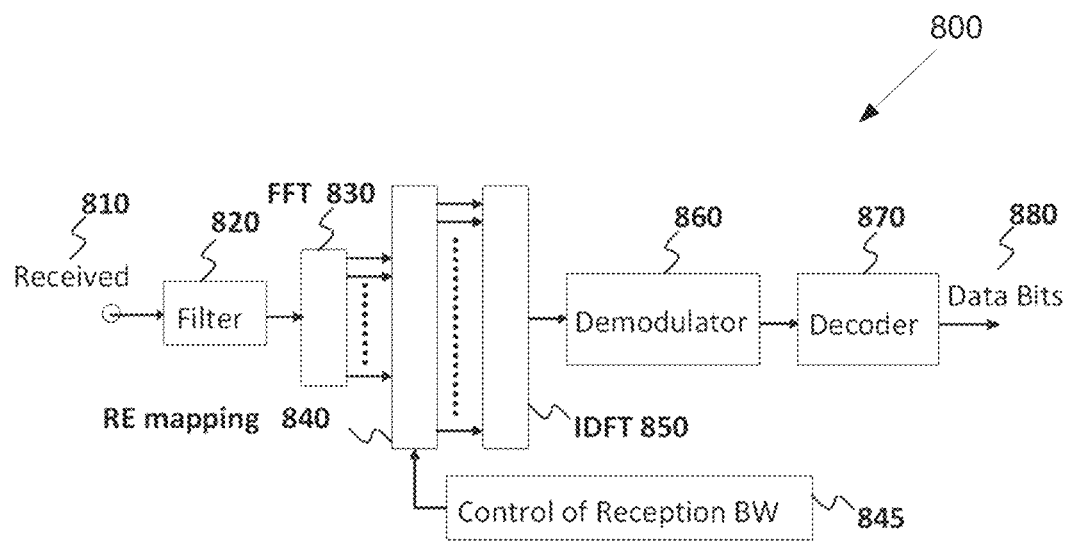
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
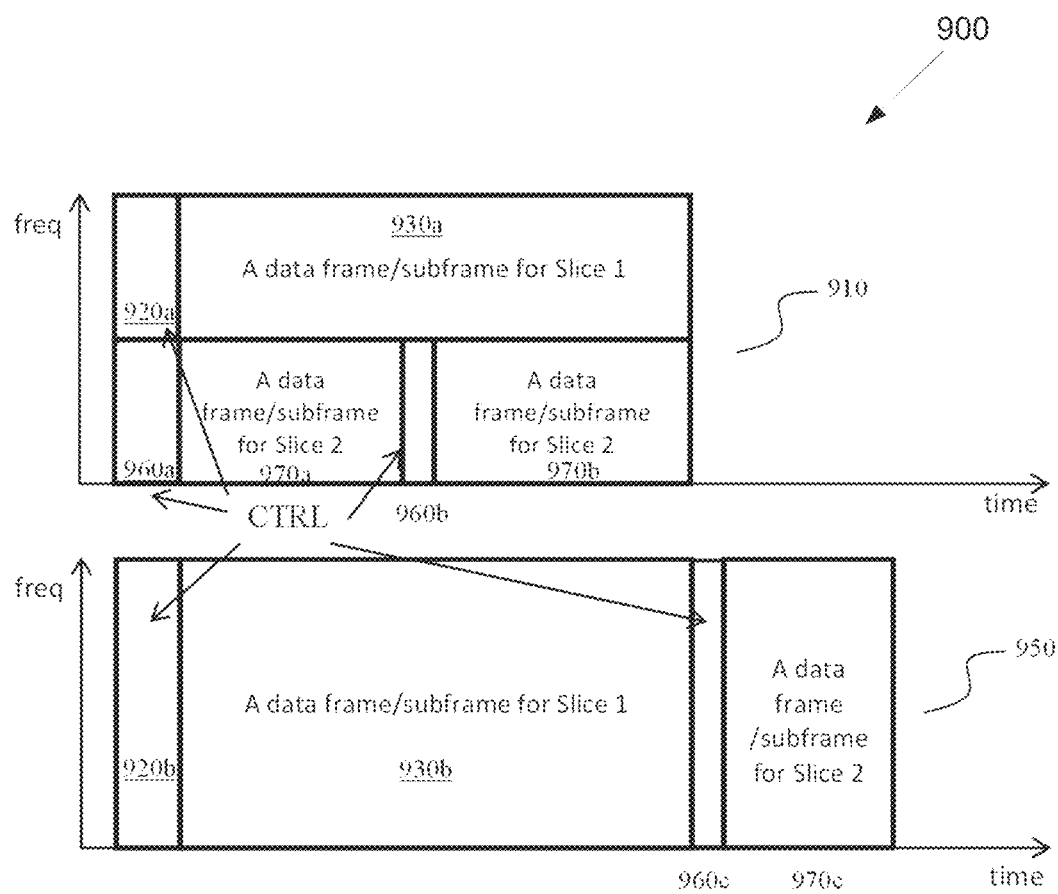
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
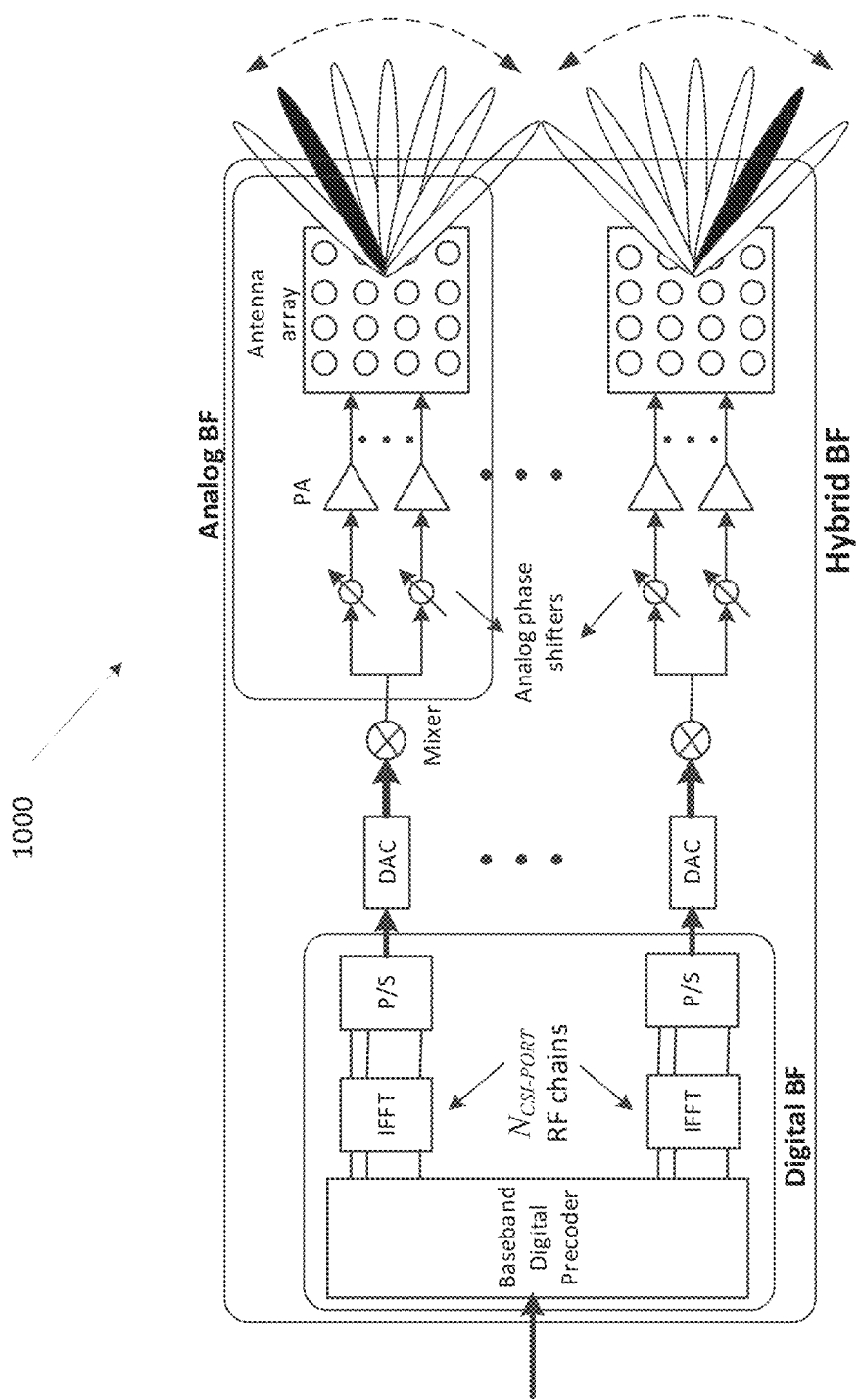
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports NCSI-PORT. A digital beamforming unit performs a linear combination across NCSI-PORT analog beams to further increase precoding gain. While analog beams are wideband (hence not frequency-selective), digital precoding can be varied across frequency sub-bands or resource blocks.

In a 3GPP LTE communication system, network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems such as 3GPP NR (new radio access or interface), efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE specification. In this case, seamless mobility is a desirable feature.

Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable.

Figure 11:
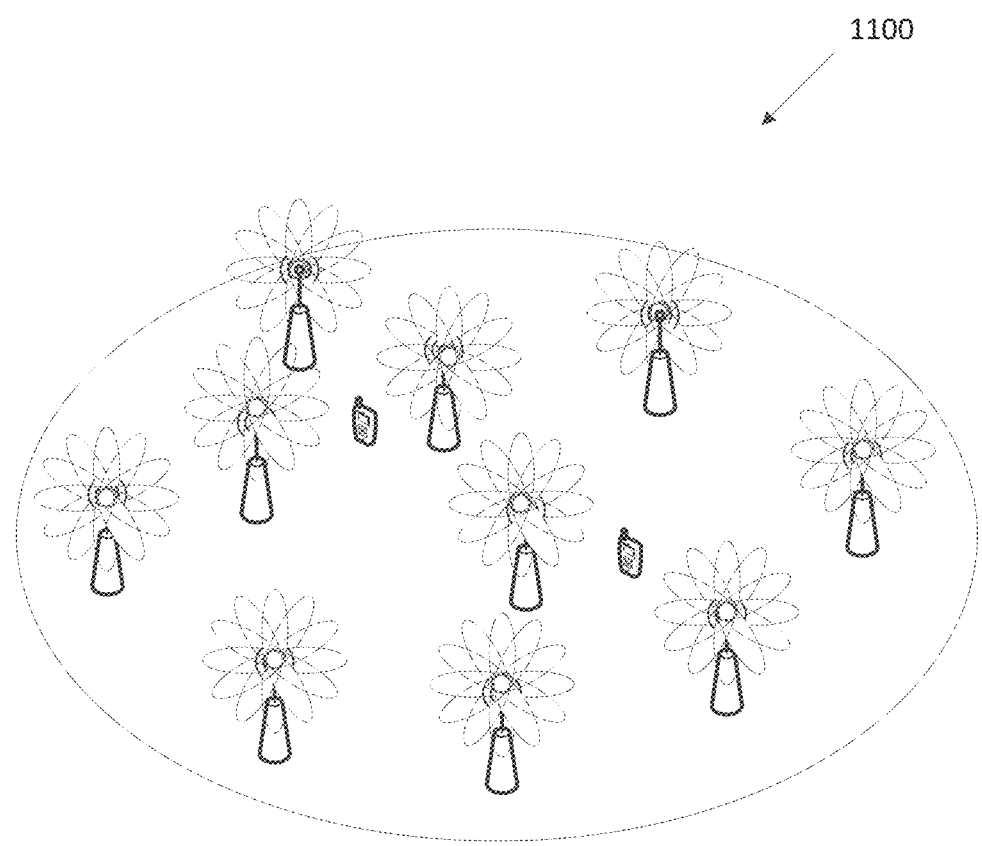
FIG. 11 illustrates an example UE mobility scenario according to embodiments of the present disclosure.

FIG. 11 illustrates an example UE mobility scenario 1100 according to embodiments of the present disclosure. The embodiment of the UE mobility scenario 1100 illustrated in FIG. 11 is for illustration only. FIG. 11 does not limit the scope of this disclosure to any particular implementation of the UE mobility scenario 1100.

For instance, the framework may be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework may be applicable whether beam sweeping (as illustrated in FIG. 11) is used or not.

Third, different frequency bands and use cases impose different coverage limitations. For example, mmWave bands impose large propagation losses. Therefore, some form of coverage enhancement scheme is needed. Several candidates include beam sweeping (as shown in FIG. 10), repetition, diversity, and/or multi-TRP transmission. For mMTC where transmission bandwidth is small, time-domain repetition is needed to ensure sufficient coverage.

A UE-centric access which utilizes two levels of radio resource entity is described in FIG. 11. These two levels can be termed as "cell" and "beam". These two terms are exemplary and used for illustrative purposes. Other terms such as radio resource (RR) 1 and 2 can also be used. Additionally, the term "beam" as a radio resource unit is to be differentiated with, for instance, an analog beam used for beam sweeping in FIG. 10.

As shown in FIG. 11, the first RR level (termed "cell") applies when a UE enters a network and therefore is engaged in an initial access procedure. In 1110, a UE 1111 is connected to cell 1112 after performing an initial access procedure which includes detecting the presence of synchronization signals. Synchronization signals can be used for coarse timing and frequency acquisitions as well as detecting the cell identification (cell ID) associated with the serving cell. In this first level, the UE observes cell boundaries as different cells can be associated with different cell IDs. In FIG. 11, one cell is associated with one TRP (in general, one cell can be associated with a plurality of TRPs). Since cell ID is a MAC layer entity, initial access involves not only physical layer procedure(s) (such as cell search via synchronization signal acquisition) but also MAC layer procedure(s).

The second RR level (termed "beam") applies when a UE is already connected to a cell and hence in the network. In this second level, a UE 1111 can move within the network without observing cell boundaries as illustrated in embodiment 1150. That is, UE mobility is handled on beam level rather than cell level, where one cell can be associated with N beams (N can be 1 or >1). Unlike cell, however, beam is a physical layer entity. Therefore, UE mobility management is handled solely on physical layer. An example of UE mobility scenario based on the second level RR is given in embodiment 1150 of FIG. 11.

After the UE 1111 is associated with the serving cell 1112, the UE 1111 is further associated with beam 1151. This is achieved by acquiring a beam or radio resource (RR) acquisition signal from which the UE can acquire a beam identity or identification. An example of beam or RR acquisition signal is a measurement reference signal (RS). Upon acquiring a beam (or RR) acquisition signal, the UE 1111 can report a status to the network or an associated TRP. Examples of such report include a measured beam power (or measurement RS power) or a set of at least one recommended "beam identity (ID)" or "RR-ID". Based on this report, the network or the associated TRP can assign a beam (as a radio resource) to the UE 1111 for data and control transmission. When the UE 1111 moves to another cell, the boundary between the previous and the next cells is neither observed nor visible to the UE 1111. Instead of cell handover, the UE 1111 switches from beam 1151 to beam 1152. Such a seamless mobility is facilitated by the report from UE 711 to the network or associated TRP—especially when the UE 1111 reports a set of M>1 preferred beam identities by acquiring and measuring M beam (or RR) acquisition signals.

In the present disclosure, a "beam" can correspond to an RS resource or one port in RS or one port+one time unit in RS, whether the beam is a sounding reference signal (SRS), CSI-RS, beam RS, measurement RS, or any other type of RS.

In some embodiments, a signaling element transmitted from a TRP and, in turn, is received by a UE, in a control search space of a DL control resource set that a TRP configures for a UE and can dynamically indicate a set of one or more parameters for the UE to decode one or more PDCCH candidates. The control search space can be common to a group of UEs or specific to the UE. For brevity, this signaling element is referred to as signaling element A. A TRP transmits the signaling element A to a UE in a control search space configured to the UE. The signaling element A can include the scheduling information for PDCCH transmission that conveys DCI for the UE. The signaling element A can also include a CRC for the scheduling information where the CRC bits are scrambled (XOR operation) with a radio network temporary identifier (RNTI) that a TRP configures to one or more UEs by higher layer signaling. An example of the RNTI is C-RNTI which functions as a UE identification. Alternatively, a group RNTI can also be used which functions as an identification for a group of UEs.

The UE is configured to decode a signaling element A in each slot or in a period of slots. The TRP can transmit the signaling element A with one or more possible CCE aggregation levels that can be configured to the UE by higher layers or be predetermined in a system operation, such as for example a CCE aggregation level of 8 CCEs or 16 CCEs that includes the first CCEs in a DL control resource set. When a UE detects a valid signaling element A (for example, a checksum of a CRC included in the encoded information bits of signaling element A is zero), the UE can process the information in signaling element A to decode one or more PDCCH candidates based on the configuration information in the detected signaling element A. The DCI in a detected PDCCH can schedule a NR-PDSCH transmission or grant a NR-PUSCH transmission.

Figure 12:
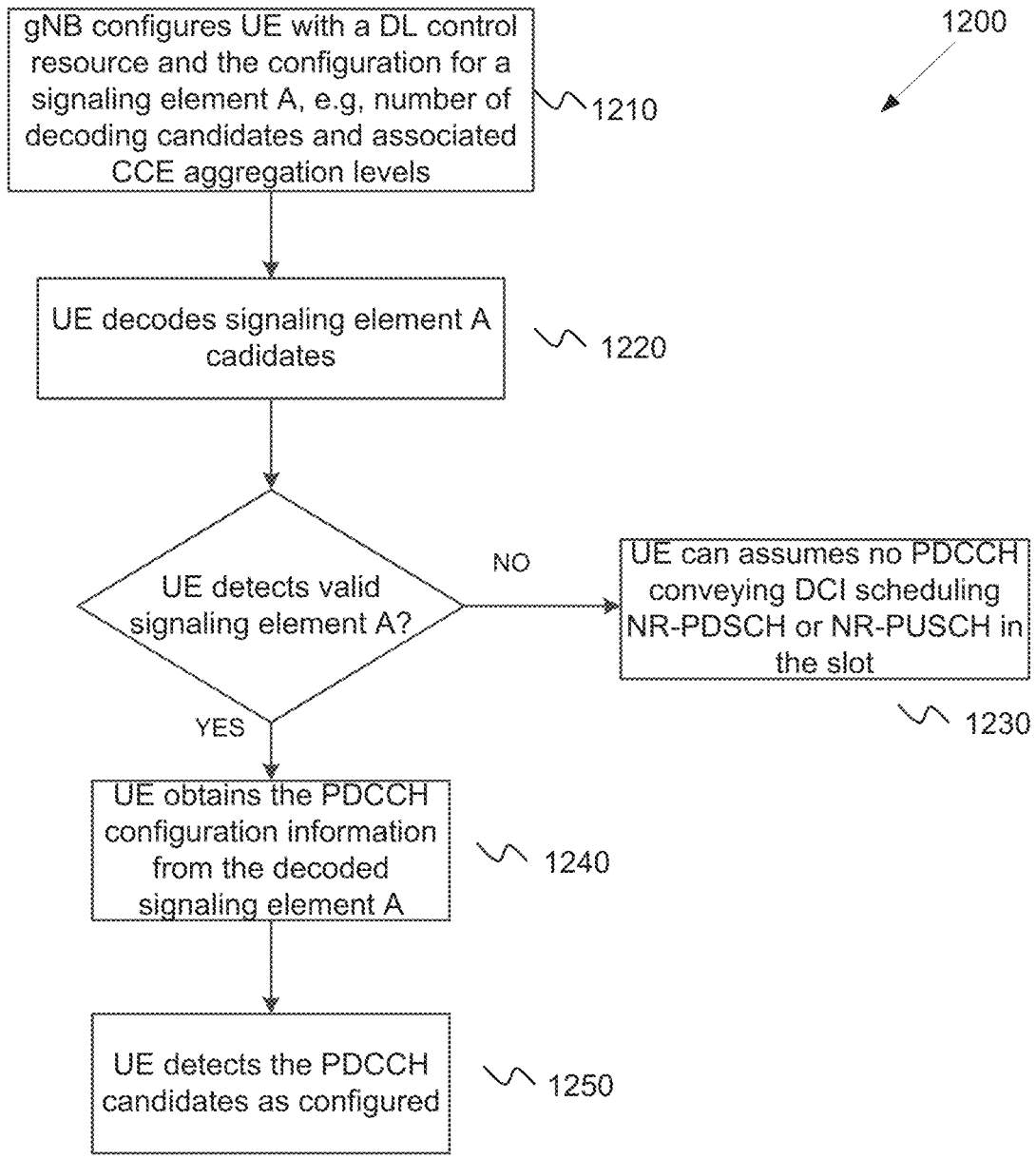
FIG. 12 illustrates an example procedure of decoding PDCCH and DCI in a slot according to embodiments of the present disclosure.

FIG. 12 illustrates an example procedure of decoding PDCCH and DCI in a slot 1200 according to embodiments of the present disclosure. The embodiment of the procedure of decoding PDCCH and DCI in a slot 1200 illustrated in FIG. 12 is for illustration only. FIG. 12 does not limit the scope of this disclosure to any particular implementation.

A TRP configures by high layers a UE with a DL control resource set and a configuration for transmission of a signaling element A in the DL control resource set such as number of decoding candidates and associated CCE aggregation levels in step 1210. The UE decodes signaling element A transmission in a search space that includes CCEs in the DL control resource set by decoding signaling element A candidates in step 1220.

It is also possible that a predetermined configuration in a system operation is used for one or more candidates and corresponding CCE locations. When the UE does not detect any signaling element A in a slot in step 1230, the UE can assume there is no PDCCH conveying DCI scheduling NR-PDSCH or NR-PUSCH to decode in the slot. Alternatively, the UE can apply a fallback operation where the UE decodes PDCCH candidates according to another search space, such as a UE-specific search space, in the DL control resource set and does not rely on signaling element A to indicate parameters for the transmission of PDCCH candidates.

When the UE successfully detects a signaling element A in the slot in step 1240, the UE can obtain the configuration information for transmissions of one or more PDCCH candidates from the detected signaling element A, including for example location of PRBs information, beam ID information, and MCS (or CCE aggregation levels) used to transmit the one or more PDCCH candidates. When the UE detects a PDCCH candidate, as configured by the corresponding signaling element A, that conveys a DCI scheduling a NR-PDSCH or a NR-PUSCH transmission, the UE can proceed with a reception of the NR-PDSCH or a transmission of the NR-PUSCH in step 1250.

Figure 13:
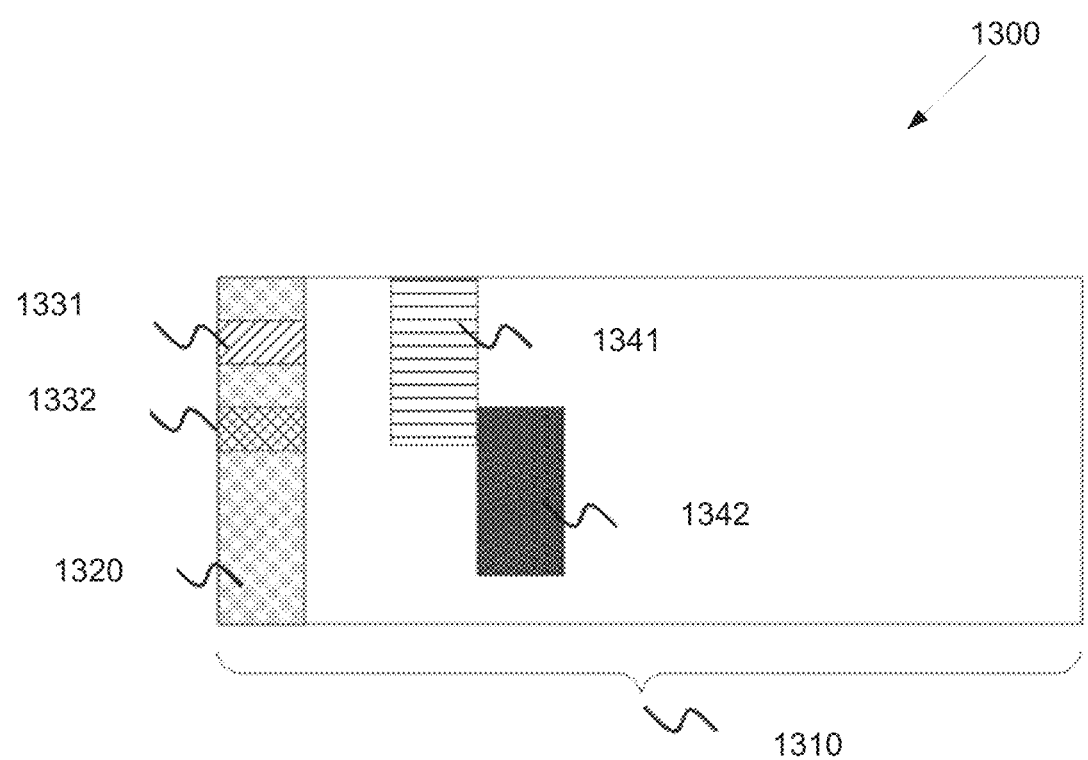
FIG. 13 illustrates an example transmission and functionality of a signaling element A according to embodiments of the present disclosure.

FIG. 13 illustrates an example transmission and functionality of a signaling element A 1300 according to embodiments of the present disclosure. The embodiment of the transmission and functionality of a signaling element A 1300 illustrated in FIG. 13 is for illustration only. FIG. 13 does not limit the scope of this disclosure to any particular implementation.

As shown in FIG. 12, in slot 1310, one or more UEs are configured a DL control resource set and to decode a signaling element A that a TRP transmits in the DL control resource set 1320. In one example, the signaling element A can be transmitted in a first OFDM symbol of slot 1310. A first signaling element A 1331 in the DL control resource set 1320 indicates parameters (configuration information) for a first PDCCH transmission 1341. A second signaling element A 1332 in the DL control resource set 1320 indicates parameters for a second PDCCH transmission 1342. A first UE that successfully decodes (detects) signaling element A 1331 can proceed to decode the first PDCCH transmission 1341 based on the configuration information conveyed in signaling element A 1331.

A second UE that successfully decodes signaling element A 1332 can proceed to decode the second PDCCH transmission 1342 based on the configuration information conveyed in signaling element A 1332. A third UE that does no successfully decode any valid signaling element A in the DL control resource set 1320 can assume that it does not need to decode any PDCCH candidates in slot 1310 or can decode PDCCH candidates conveying DCI formats for NR-PDSCH or NR-PUSCH scheduling in the DL control resource set, that is, decode PDCCH candidates according to a search space of CCEs in the DL control resource set instead of according to configuration information provided by signaling element A (this is referred to as fallback operation).

The functionality of signaling element A is to configure transmission of one or more PDCCH candidates. The signaling element A can include one or more of the following fields. In one example, a PDCCH resource configuration field indicating the time-frequency resources where the PDCCH is allocated. For example the resource configuration can include one or more of (1) the indices of a starting PRB and ending PRB of the frequency location where a TRP can transmit one or more PDCCH candidates, (2) the index of a starting PRB and a number of PRBs of the frequency location where a TRP can transmit one or more PDCCH candidates, (3) the OFDM symbol indices and PRB indices to indicate the time-frequency resource location, or (4) time-frequency resources for CCE locations and CCE aggregation levels for one or more PDCCH candidates.

In another example, the MCS level used by the DCI transmission in the scheduled PDCCH (can be considered to be similar to the CCE aggregation levels for a given DCI format size and a given modulation order).

In yet another example, the DCI format configuration field indicating the DCI format candidate(s) transmitted in the scheduled PDCCH. For example, one DCI format is indicated for the configured PDCCH and the UE is requested to detect the configured DCI format. For example, multiple DCI format candidates are indicated for PDCCH transmissions, for example to schedule NR-PDSCH transmissions and NR-PUSCH transmissions, and the UE is requested to detect each indicate DCI format candidate.

In yet another example, the beam ID configuration field indicating the information of TRP Tx beam used to transmit the PDCCH. This information can be used to assist the UE in selecting an Rx beam selection for the detection of PDCCH candidates, for example, for operation in high carrier frequency that is expected to be based on multi-beam transmissions. The beam ID information can be a quasi-collocated (QCL) resource of a reference signal (RS) resource. The RS resource can be a secondary synchronization signal (NR-SSS), a channel state information RS (CSI-RS), or a measurement RS (MRS).

The beam ID information can be QCL parameters related with spatial information of UE-side Rx beamforming. The advantage of indicating a beam ID is that a larger information payload of a DCI format conveyed by a PDCCH transmission configured by signaling element A can be transmitted with a narrow-beam indicated by the signaling element A while a smaller information payload for the configuration information conveyed by signaling element A can be transmitted with a wide-beam. By transmitting larger information payloads with a narrow beam and reducing the information payloads that need to be transmitted with a wide beam, system coverage can materially improve compared to the case that the DCI format is transmitted with a wide beam.

Without a signaling element A, transmission of a PDCCH conveying a DCI format with a wide beam would be necessary as otherwise a UE would have to perform decoding operations over tens of narrow beams and this would result to increase scheduling latency and increased UE complexity. It is therefore beneficial to transmit with wide beam small configuration information through a signaling element for an index of a narrow beam used to transmit one or more PDCCHs conveying respective DCI formats instead of transmitting the one or more PDCCHs with the wide beam. The term "beam ID" is used for illustrative purposes. Any other term which serves the same functionality, such as "resource ID" or "CSI-RS Resource Index" (when a "beam" corresponds to a CSI-RS resource or resource unit), can be used: number of DCI formats field that indicates a number of DCI formats conveyed by one or more PDCCH transmissions; and/or scrambling ID field indicating the RNTI(s) are used for scrambling a CRC of the one or more DCI formats.

In one embodiment, the configuration of PDCCH transmissions can be dynamically indicated by signaling element A. In one example, the configuration of PDCCH transmissions can be indicated through a hybrid method in which some parameters can be configured by high layers (for example RRC signaling) or be predetermined in a system operation and some parameters can be configured by signaling element A. For example, a starting OFDM symbol and possible CCE aggregation levels for candidate PDCCH transmissions can be configured by higher layers while frequency resources and actual CCE aggregation levels (from the configured CCE aggregation levels) for candidate PDCCH transmissions can be indicated by signaling element A.

In one example, the signaling element A indicates PRB locations and beam ID information for candidate PDCCH transmissions. The MCS level, or the CCE aggregation level, can be configured by high layers or can also be indicated by signaling element A from a set of MCS configured by higher layers. A number of DCI formats can be predefined to be one or can be indicated by signaling element A. A scrambling ID for a DCI format in a PDCCH transmission can be same as a scrambling ID for signaling element A that configures parameters for the indicates the PDCCH transmissions.

In one example, a beam ID configuration field in the signaling element A can indicate to a UE a Tx beam of a TRP that is used to transmit one or more PDCCHs and a DCI format conveyed by a PDCCH can indicate Tx beam of the TRP that is used to transmit a NR-PDSCH scheduled by the DCI format or indicate a Tx beam of the UE that is used to transmit a NR-PUSCH scheduled by the DCI format.

In one example, a beam ID configuration field in signaling element A can indicate to a UE a Tx beam of a TRP that is used to transmit both a configured PDCCH transmission and a NR-PDSCH transmission that is scheduled by a DCI format conveyed by the PDCCH transmission. In this case, the DCI format and the NR-PDSCH transmission that is scheduled by the DCI are transmitted with a same TRP Tx beam or can be received with a same UE Rx beam set.

The signaling element A can be associated with various IDs that a TRP can configure to UEs for scrambling a CRC of a signaling element A. The ID can be a UE ID (e.g., C-RNTI), a UE-group ID, a cell ID, a service ID, RA-RNTI, SPS-RNTI, SI-RNTI.

The DL control resource set can be configured by a system information block, such as a master information block (MIB) or a secondary information block (SIB), or by UE-dedicated higher layer signaling, or can be implicitly derived from a TRP ID such as a cell ID. The configuration of the DL control resource set can include a number of OFDM symbols in a slot or a number and location of PRBs in a DL system bandwidth and can further include possible CCE locations, CCE aggregation levels, and number of signaling element A candidates in the DL control resource set. The configuration of the DL control resource set can also include an association between an index of slot for the existence of the DL control resource set and a coverage beam as is discussed in the next embodiment of the present disclosure.

A multi-beam based system typically requires two categories of beams. A first beam category includes coverage beams and a second beam category includes data beams. A coverage beam provides basic coverage functionality and can be considered as virtual sectorization. A coverage beam is typically wide enough to provide sufficient robustness with respect to UE mobility, UE rotation, and signal blockage. A data beam is typically customized for each individual UE and can be a narrow beam to improve a signal-to-noise and interference ratio (SINR) experienced by the UE and support high data rates.

In one embodiment, beams transmitting NR-SS can be coverage beams. In a multi-beam based system, multiple NR-SS blocks are multiplexed in the time domain and each NR-SS block corresponds to one coverage beam. The coverage beam can also be conveyed in some RS, for example a CSI-RS that is intended for a group of UEs. In one embodiment, beam management for a DL control resource set can operate as follows. In one example of PDCCH transmissions in a DL control resource set can be with one of the coverage beams, the coverage beam is the beam used to transmit a NR-SSS block. In another example, a UE can report one selected NR-SS block index to a TRP. In yet another example, an association between a slot index for the DL control resource set and the NR-SS block index can be configured through a SIB such as a first SIB (SIB1). Alternatively, the association can be predetermined. In yet another example, the UE can assume to only monitor the spaced control resource set in slots that are associated with the NR-SS block index selected and reported by the UE.

In yet another example, the UE monitors the signal quality of NR-SS blocks. The UE can select and periodically report to one or more NR-SS block indexes. When the UE reports one or more NR-SS block indexes that include at least one index that is different from a previously reported NR-SS block index, the UE can assume to monitor the DL control resource set in slots which correspond to the latest NR-SS block index or the TRP can re-configure the UE the slots to monitor a DL control resource set based on the reported one or more NR-SS block indexes. When a UE does not receive such configuration from the gNB, the UE can continue monitoring the slots corresponding to a current DL control resource set. A TRP can continue to transmit to the UE using the current DL control resource set until the TRP receives a positive acknowledgement that the UE received a configuration for slots associated with a new DL control resource set. During a time between a transmission to a UE of a configuration of slots for a new DL control resource and a time that a TRP can assume that the TRP can assume that the UE has applied the configuration, the TRP can use to transmit to the UE and the UE can use to receive from the TRP PDCCH in a fallback/default DL control resource set.

A PDCCH transmission can be either with coverage beam, such as for fallback operation, or with a data beam, such as when a UE-specific DL control resource set configuration is enabled. The information of Tx beam used for PDCCH transmission can be dynamically indicated in the signaling element A in a DL control resource set using a coverage beam that can be same as a DL control resource set for PDCCH transmissions when a TRP considers that a configuration of a UE-specific DL control resource set is not enabled.

There may be L1/L2 beam management procedures in NR. In one example, P-1 is used to enable UE measurement on different TRP Tx beams to support selection of TRP Tx beams/UE Rx beam(s). In such example, for beamforming at TRP, it typically includes an intra/inter-TRP Tx beam sweep from a set of different beams. For beamforming at UE, it typically includes a UE Rx beam sweep from a set of different beams.

In another example, P-2 is used to enable UE measurement on different TRP Tx beams to possibly change inter/intra-TRP Tx beam(s). In such example, a possibly smaller set of beams for beam refinement than in P-1 may be used. Note that P-2 can be a special case of P-1. In yet another example, P-3 is used to enable UE measurement on the same TRP Tx beam to change UE Rx beam in the case UE. In such example, beamforming may be used.

A flexible and modular CSI measurement and reporting framework has been proposed. For a single UE, the CSI framework includes one or more CSI reporting settings, one or more RS settings and one CSI measurement settings. A CSI reporting setting configures a UE with CSI reporting parameters and an RS setting configures a UE with one or more RS resources for the purpose of CSI measurement and calculation. The CSI reporting settings and RS settings are linked with CSI measurement settings. An example of the CSI framework is illustrated in FIG. 14.

Figure 14:
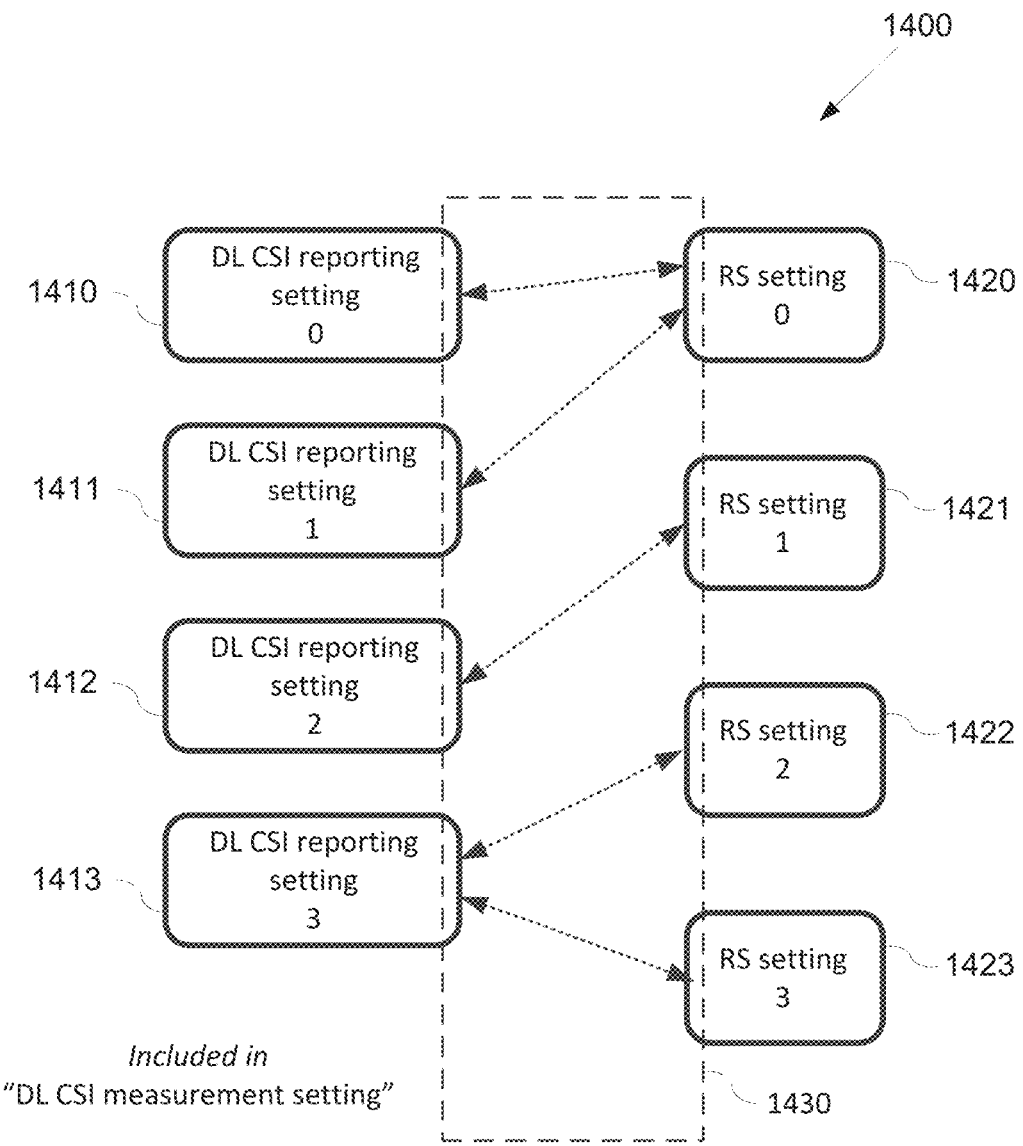
FIG. 14 illustrates an example CSI framework according to embodiments of the present disclosure.

FIG. 14 illustrates an example CSI framework 1400 according to embodiments of the present disclosure. The embodiment of the CSI framework 1400 illustrated in FIG. 14 is for illustration only. FIG. 14 does not limit the scope of this disclosure to any particular implementation.

In the present, beam measurement and reporting mechanisms for beam management are proposed and designed utilizing a flexible and unified CSI framework.

In one embodiment, a DL CSI framework for a UE includes at least one CSI reporting setting for beam measurement and reporting, at least one RS setting for beam measurement and reporting, and one CSI measurement setting. The "RS setting" can be called Resource setting, RS configuration, resource configuration, RS resource setting, RS resource configuration. The name "RS setting" is exemplary and can be substituted with other name or labels without changing the substance of the embodiments in this disclosure.

A CSI reporting setting for beam measurement and reporting configures a UE with beam state information reporting parameters that the UE needs to calculate and report to a network. An RS setting configures a UE with one or more RS resources for the purpose of beam state information measurement and calculation. For instance, one of the configured RSs can be a CSI-RS where multiple CSI-RS resources can be used for CSI-RS transmission and each CSI-RS resource can correspond to one Tx beamformer. A CSI measurement setting provides a linkage/coupling between CSI reporting and RS setting.

In one embodiment, a DL CSI framework for a UE includes at least one CSI reporting setting, at least one RS setting, and one CSI measurement setting. A CSI reporting setting can configure a UE with CSI reporting parameters that the UE needs to calculate and report; or beam state information reporting parameters that the UE needs to calculate and report, or both CSI and beam state information reporting parameters. An RS setting can configure a UE with one or more RS resources for measurement and CSI calculation, or for measurement and beam state information calculation, or for both CSI and beam state information measurement and calculation. A CSI measurement setting provides a linkage/coupling between CSI reporting settings and RS settings.

In one example, a UE is configured with N CSI reporting settings and M RS settings. A CSI measurement setting links each of the N CSI reporting settings with at least one of the MRS settings. Out of the N CSI reporting settings, P≤N CSI reporting settings can include configuration of parameters including for beam state information reporting. Out of the M RS settings, Q≤N RS settings can include configuration of one or more RS resources for measurement and beam state information calculation. This is illustrated in FIG. 15, where N=6, M=6, P=2 and Q=3.

Figure 15:
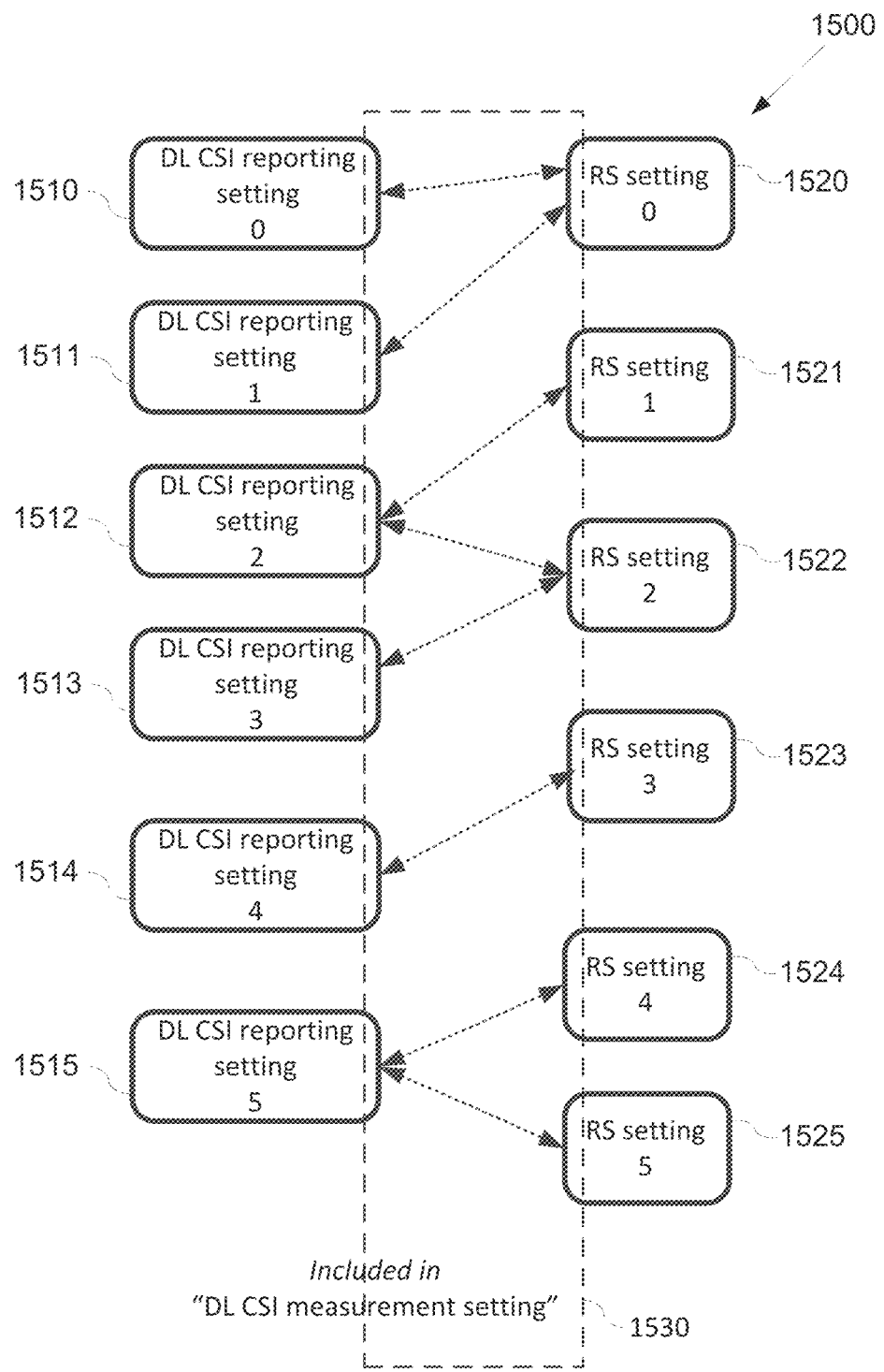
FIG. 15 illustrates an example CSI reporting setting according to embodiments of the present disclosure.

FIG. 15 illustrates an example CSI reporting setting 1500 according to embodiments of the present disclosure. The embodiment of the CSI reporting setting 1500 illustrated in FIG. 15 is for illustration only. FIG. 15 does not limit the scope of this disclosure to any particular implementation.

As shown in FIG. 15, a UE is configured with N=6 CSI reporting settings (CSI reporting settings indexed by 0-5 that are associated with embodiments 1510-1515) and M=6 RS settings (RS setting indexed by 0-5 that are associated with embodiments 1520-1525). Out of N=6 CSI reporting settings, P=2 CSI reporting settings 1514 and 1515 configure beam state information parameters that the UE needs to calculate and report. Out of M=6 RS settings, Q=3 RS settings 1523, 1524 and 1525 configure RS resources that the UE can use for measurements to calculate the beam state information parameters. The six CSI reporting settings and six RS setting are linked with CSI measurement setting 1530. Specifically, regarding the beam state information reporting, CSI reporting 4 1514 is linked with RS setting 3 1523, and CSI reporting setting 5 1515 is linked with RS settings 4 and 5, 1524 and 1525.

The above configurations, including the configuration for beam state information reporting, can be signaled by a network to a UE through higher layers, MAC-CE, and/or L1 signaling. A UE can follow the configuration in a CSI reporting setting to perform measurements and calculate the beam state information on the RS resources configured by the RS setting(s) that is linked to the CSI reporting setting in the CSI measurement setting.

In the example shown in FIG. 15, a UE is configured to follow the beam state information parameter configuration in CSI configuration setting 4 (1514) to perform measurements and calculate and report the beam state information on the RS resources configured by RS setting 3 (1523). The UE is configured to follow the beam state information parameter configuration in CSI configuration setting 5 (1515) to perform measurements and calculate, and report the beam state information on RS resources configured by RS setting 4 (1524) and RS resources configured by RS setting 5 (1525).

In one embodiment, a RS setting is not linked with any CSI reporting setting in a CSI measurement setting. A UE can be configured to perform measurements on the RS resources configured by such RS setting without reporting any information to the NW. This approach can be used in the P-3 procedure of beam management. The UE can measure different receive beams by measuring the RS resources configured by a respective RS setting.

A CSI reporting setting for beam state information reporting can include one or more of the following components to configure the beam state information calculation and reporting. In one example of general setting information such as "mode." Mode indicates whether CSI reporting is periodic, semi-persistent, aperiodic, and can also include a slot configuration that provides a reference slot number and a slot periodicity for CSI reporting.

In another example of Beam indicator information setting, configures a UE to report index information of selected TRP Tx beams. In one example, the UE can report the indices of one or more selected CSI-RS resources from the K CSI-RS resources configured by a RS setting. In one example, the UE can report the indices of one or more selected NR-SS blocks. In yet another example, beam group information setting, configures a UE to report an index (or indices) of selected beam group(s). In one example, RS resources configured by a RS setting can correspond to one beam group. A CSI reporting setting linked with two RS settings can configure the UE to measure beam state information over two groups of beams where each group of beams can be represented by the RS resources configured by one of these two RS settings.

In yet another example of beam quality information setting, configures a UE to report the RSRP/RSRQ/CQI information of one CSI-RS resource or one NR-SS block. It can configure a UE to report beam-specific interference measurement. In one example, it can configure a UE to report a beam-specific SINR and/or inter-beam interference.

In yet another example of beam direction restriction setting, indicates to a UE that TRP Tx beams applied to CSI-RS resources are restricted to a subset of directions. This information can assist the UE to select an Rx beam to receive and perform measurements using the indicated CSI-RS resources. In one instance, the beam direction restriction setting can indicate that a TRP Tx beam direction applied to CSI-RS resources configured in a first RS setting is restricted to a beam direction conveyed by one or more CSI-RS resources configured in a second RS setting. In another instance, the beam direction restriction setting can indicate that a TRP Tx beam direction applied to CSI-RS resources during an n-th calculation and reporting triggered by CSI reporting setting is restricted to a beam direction conveyed by one or more CSI-RS resource index reporting in a (n−1)-th CSI reporting setting. In yet another instance of indicator of reporting, indicates to a UE that the UE does not need to report any measurement. The indication can also be implicit by omitting beam reporting parameters. The indicator of reporting can be signaled through a MAC-CE or by L1 signaling.

A CSI reporting setting can include the beam indicator information setting. The beam indicator information can be an index of a single beam. In one example, when a NR-SSS is used as RS for beam measurement, the beam indicator information can be the index of a SS block. In one example, when a CSI-RS is used as RS for beam measurement, the beam indicator information can be the index of one CSI-RS resource. In one example, when a NR-SRS is used as RS for beam measurement, the beam indicator information can be the index of one NR-SRS resource. The beam indicator information can configure a UE to report indices of multiple beams that can be indices of one or more SS blocks, indices of one or more CSI-RS resources, or indices of one or more NR-SRS resources.

The beam indicator information can include ordering information of beam qualities. In one example, a UE reports a set of R CSI-RS resource indices $\{C_{i1}, C_{i2}, \ldots, C_{iR}\}$, that can be arranged in an ascending or descending order, and the ordering information indicates the relative beam quality, such as relative RSRP, for CSI-RS transmissions on respective CSI-RS resources. In one example, a set of R SS block indices $\{B_{i1}, B_{i2}, \ldots, B_{iR}\}$, that can be arranged in an ascending or descending order, is reported and the ordering information indicates the relative RSRP of the reported SS blocks. The beam indicator information setting can include a number R of beam indices reported. In one example, the UE is requested to report R selected CSI-RS resource indices or SS block indices. In one example, the UE is requested to report up to R selected CSI-RS resource indices or SS block indices.

In one embodiment, the RS type in one RS setting (resource setting) can be NR-SS block (or called SS/PBCH block). The RS setting can configure all the actually transmitted SS/PBCH blocks. In one method, one flag in RS setting, on/off or presence/absence can indicate that all the actually transmitted SS/PBCH blocks are configured in that RS setting and the UE can be requested to obtain the information of actually transmitted SS/PBCH blocks from: UE-specific RRC signaling with full bitmap that can indicate the actually transmitted SS blocks; and/or the RMSI in which compressed bitmap is used to indicate the actually transmitted SS blocks.

If the RS setting indicates the all actually transmitted SS/PBCH blocks are configured, the UE can be requested to do the following: if the UE has received a bitmap from the RRC signaling, the UE can assume the actually transmitted SS/PBCH block according to the bitmap in RRC based signaling to be configured by that RS setting; if the UE has received no bitmap through RRC signaling, the UE can assume SS/PBCH block transmission according to the bitmap in RMSI to be configured by that RS setting; and/or if the UE has not received bitmap from either RSMI or RRC, the UE can assume a default SS/PBCH block transmission to be configured by that RS setting.

In one embodiment, one CSI reporting can configure the subset of SS/PBCH blocks from the SS/PBCH block configured by one RS setting for the UE to measure and report. In one example, one RS setting can configure N SS/PBCH blocks. One CSI reporting setting can configure a subset of those N SS/PBCH blocks or all of those SS/PBCH blocks for one UE to measure and report. The UE can be requested to only select one or multiple SS/PBCH blocks from the subset of SS/PBCH blocks indicated by the CSI reporting setting and report to the NW. The index of selected SS/PBCH block reported by the UE can be index within the selected subset. In one example, the CSI reporting setting configures M=16 SS/PBCH blocks $\omega=\{SB_i, SB_j, SB_l, SB_k\}$ from the configured N=64 SS/PBCH blocks in RS setting$\{SB_1, SB_2, \ldots, SB_{64}\}$. The UE can be configured to report 0x00, 0x01, 0x10 and 0x11 if he chooses to report SS/PBCH blocks $SB_i$, $SB_j$, $SB_l$, $SB_k$, respectively.

In one embodiment, one RS setting can configure the transmission of SS/PBCH blocks for beam measurement and reporting though a first bitmap. UE-specific RRC signaling can configure a second bitmap (can be called full bitmap) to indicate the actually transmitted SS blocks for both sub 6 GHz and over 6 GHz cases. The RMSI can signal the actually transmitted SS/PBCH blocks to the UE. A first bitmap can be different from a second bitmap. To obtain information of SS/PBCH for beam management, beam measurement and reporting, the UE can be requested to do one or more of the followings. In one example, the UE can be configured to use a first bitmap in one RS setting to calculate the actually transmitted SS/PBCH blocks for beam management, measurement and reporting. A first bitmap can be a 64-bits and each bit is used to indicate whether the corresponding SS/PBCH block is configured in that RS setting.

In another example, the UE can be configured to first do AND (or XOR, or OR) operation between a first bitmap and a second bitmap to obtain a third bitmap. Each bit in a third bitmap can be used to indicate whether the corresponding SS/PBCH block is configured in that RS setting. In yet another example, the UE can be configured to first calculate a third bitmap based on the configuration of actually transmitted SS/PBCH blocks in RMSI. In a third bitmap, each bit is used to represent whether the corresponding SS/PBCH is configured for transmission by the RMSI. Then the UE can do AND (or XOR, or OR) operation between a third bitmap to obtain a forth bitmap. Each bit in a forth bitmap can be used to indicate whether the corresponding SS/PBCH block is configured in that RS setting.

The UE can be requested to report compressed bits for reported SS/PBCH block index. In one example, a RS setting configures 16 SS/PBCH blocks $\{SB_{i1}, SB_{i2}, \ldots, SB_{i16}\}$ for beam management, measurement and reporting based on one or more of the above method. The UE can be requested to report bits 0x0000 if the UE select/report SS/PBCH block $SB_{i1}$. The UE can be requested to report bits 0x0001 if the UE select/report SS/PBCH block $SB_{i1}$. The UE can be requested to report bits 0x1111 if the UE select/report SS/PBCH block $SB_{i16}$.

A CSI reporting setting can be linked with multiple RS settings for beam state information acquisition. A beam indicator information setting can configure a UE to report one or more CSI-RS resource indices from each linked RS setting. In one example, for a CSI reporting setting linked with two RS settings, the beam indicator information setting can configure the UE to report a pair of CSI-RS resource indices, one CSI-RS resource index from the CSI-RS resources configured a first linked RS setting and one CSI-RS resource index from the CSI-RS resources configured from a second linked RS setting. The UE can be configured to report (up to) R pairs of CSI-RS resource indices.

In one example, a CSI reporting setting can be one or more of the following CQI parameter configurations. A RSRP of each reported CSI-RS resource index; The RSRP can be normal resolution RSRP, high resolution RSRP, or low resolution RSRP. In another example, a RSRQ of each reported CSI-RS resource index; The RSRQ can be normal resolution, high resolution, or low resolution. In yet another example, a largest RSRP/RSRQ of reported CSI-RS resource indices and a mean of RSRP/RSRQ of reported CSI-RS resource indices. In yet another example, a largest RSRP/RSRQ of reported CSI-RS resource indices and a median of RSRP/RSRQ of reported CSI-RS resource indices. In yet another example, a largest RSRP/RSRQ and a smallest RSRP/RSRQ of reported CSI-RS resource indices. In yet another example, a largest RSRP/RSRQ and a smallest RSRP/RSRQ of reported CSI-RS resource indices and a median or mean of RSRP/RSRQ of reported CSI-RS resource indices.

A beam group information setting can configure a UE to report one or more selected beam group. In one example, the UE can be configured to report one or more RS resources sets that are configured by one or more RS settings. The beam group information setting can include a reporting duty cycle of reported beam group indexes. In one example, the UE can be configured to report an index of one beam group with lower duty cycle and the beam group index can be the index of RS setting that configures the RS resource. The UE can also be configured to report one or more RS resource indices from configured RS settings with a higher duty cycle.

A RS setting configures RS resources that can be used by a UE to calculate beam state information parameters. A RS setting can include beam sweeping pattern information over the RS resources that can be used for beam state information calculation. In one example, the UE can be configured to assume that different RS resources correspond to different Tx beams. In one example, the UE can be configured to assume that different RS resources correspond to a same Tx beam. A beam sweeping pattern can be signaled, for example, by a 1-bit flag. In one example, the value of 1-bit flag in a RS setting can indicate the beam sweeping pattern over the RS resources configured by the RS setting. In one example, a presence or absence of the 1-bit flag in a RS setting can indicate the beam sweeping pattern over the RS resources configured by this RS setting. In one example, the 1-bit flag can indicate whether or not the RS resources are quasi-collocated (QCLed) in one RS setting.

In one embodiment, A RS setting can configure N>1 CSI-RS sets and there can be multiple CSI-RS resources in each set. The UE can be configured with the beam sweeping pattern information over those CSI-RS resources in each CSI-RS set. The RS setting can include 1-bit information for each CSI-RS set defined by that RS setting. The UE can be configured to assume the beam sweeping pattern over CSI-RS resources for each CSI-RS set.

In one embodiment, the beam sweeping pattern information for a group of semi-persistent CSI-RS resources can be configured through the activation signaling. The UE can be signaled with an activation signaling to activate the transmission of a group of semi-persistent CSI-RS resources. The activation signaling can indicate the beam sweeping pattern information for the activated semi-persistent CSI-RS transmission and the UE can be requested to assume that different CSI-RS resources correspond to different Tx beams or one same Tx beam. In one example, a 1-bit indicator can be signaled in the activation message. If the value of 1-bit indicator is 0 (or 1), the UE can assume that different Tx beams are applied to the activated semi-persistent CSI-RS resources. If the value of 1-bit indicator is 1 (or 0), the UE can assume that a same Tx beam is applied to all the activated semi-persistent CSI-RS resources.

In one embodiment, the absence and presence of an indicator in the activation message can be used to indicate the beam sweeping pattern of the activated semi-persistent CSI-RS resources. If the indicator is absent (or present) in the activation message, the UE can assume that different Tx beams are applied to the activated semi-persistent CSI-RS resources. If the indicator is present (or absent) in the activation message, the UE can assume that a same Tx beam is applied to all the activated semi-persistent CSI-RS resources.

In one embodiment, the beam sweeping pattern information for a group of aperiodic CSI-RS resources can be configured through the trigger signaling. The UE can be signaled with a trigger signaling (e.g., through DCI signaling) to trigger the transmission of a group of aperiodic CSI-RS resources. The trigger signaling can indicate the beam sweeping pattern information for the triggered CSI-RS transmission and the UE can be requested to assume that different CSI-RS resources correspond to different Tx beams or one same Tx beam.

In one example, a 1-bit indicator can be signaled in the trigger message. If the value of 1-bit indicator is 0 (or 1), the UE can assume that different Tx beams are applied to the triggered CSI-RS resources. If the value of 1-bit indicator is 1 (or 0), the UE can assume that a same Tx beam is applied to all the triggered CSI-RS resources.

In one embodiment, the absence and presence of an indicator in the trigger message can be used to indicate the beam sweeping pattern of the triggered CSI-RS resources. If the indicator is absent (or present) in the triggered message, the UE can assume that different Tx beams are applied to the triggered CSI-RS resources. If the indicator is present (or absent) in the triggered message, the UE can assume that a same Tx beam is applied to all the triggered CSI-RS resources.

A RS setting can configure the QCL of spatial information between RS resources. In one example, the QCL of spatial information between RS resources can be QCL of spatial information between RS resources configured by a RS setting. One field can be used to indicate whether or not RS resources configured by a RS setting are QCLed with respect to spatial information. In one example, a presence of a QCL of spatial information field indicates that RS resources configured by a RS setting are QCLed in spatial information and an absence indicates that RS resources configured by a RS setting are not QCLed in spatial information.

In another example, the QCL of spatial information between RS resources can be QCL of spatial information among RS resources configured by two RS settings. One field can be used to indicate that RS resources configured by a first RS setting are QCLed in spatial information to a RS resource configured in a second RS setting. In one example, one field carrying an index of a RS setting and an index of a RS resource can be used to indicate the QCL of spatial information. In one instance, a presence of such field in a first RS setting can indicate that RS resources configured in the first RS setting are QCLed for spatial information to a RS resource configured in a second RS setting with indices informed in the QCL for spatial information field.

QCL information can be signaled by higher layers (e.g., by an RRC message), or by MAC-CE or L1 signaling. In one example, RS resources configured by a first RS setting can have periodic transmission and the QCL information can be signaled by higher layers. In one example, RS resources configured by a first RS setting can be semi-persistent and the QCL information can be signaled in a MAC-CE or by L1 signaling in a corresponding activation message. In one example, RS resources configured by a first RS setting can have aperiodic transmission and the QCL information can be signaled by MAC-CE or L1 signaling in the trigger message for the aperiodic transmission.

All the aforementioned parameters in CSI reporting settings and RS settings can be signaled by higher layers (e.g. RRC), MAC-CE, and/or L1 signaling.

In the following present disclosure, CSI-RS is referred to as an exemplary RS and only for illustrative purposes. Other RS can also be used to represent the described functionalities.

Figure 16:
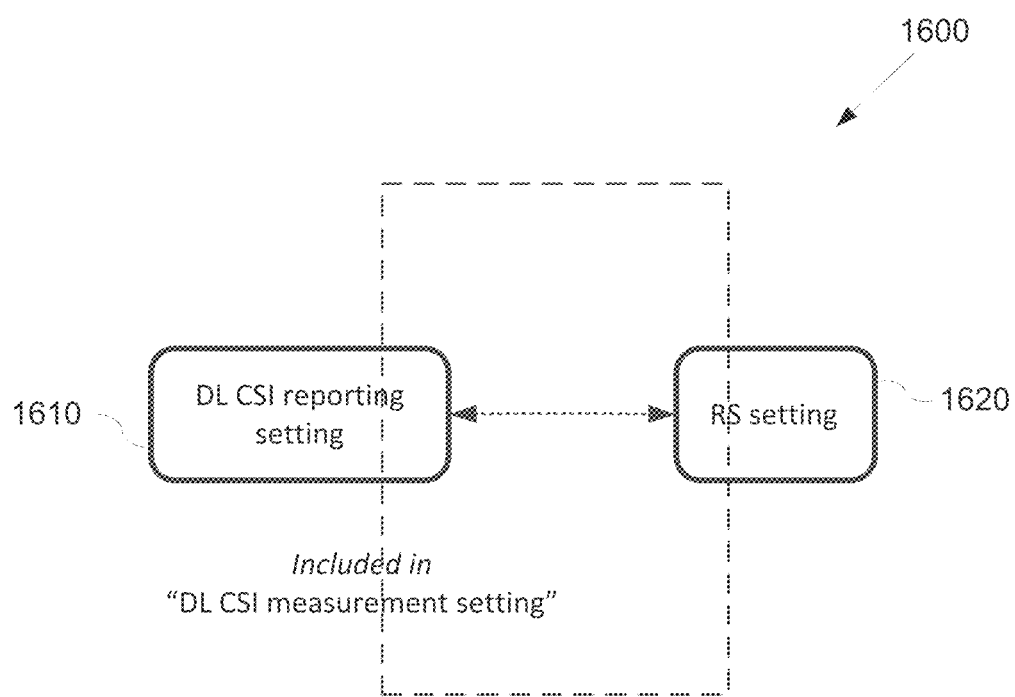
FIG. 16 illustrates another example CSI reporting setting according to embodiments of the present disclosure.

FIG. 16 illustrates another example CSI reporting setting 1600 according to embodiments of the present disclosure. The embodiment of the CSI reporting setting 1600 illustrated in FIG. 16 is for illustration only. FIG. 16 does not limit the scope of this disclosure to any particular implementation.

In one embodiment, a UE is configured with a CSI reporting setting 1610 and a RS setting 1620 for beam measurement and reporting. CSI reporting setting 1610 and RS setting 1620 are linked in CSI measurement setting, as shown in FIG. 16. A RS setting 1620 can configure K CSI-RS resources. A CSI reporting setting 1610 can configure a UE with beam reporting parameters. A UE can be configured to measure and report beam state information parameters by measuring on CSI-RS resources configured by RS setting 1620 as configured by CSI reporting setting 1610.

In one embodiment, a network can configure a UE with K CSI-RS resources by RS setting 1620 for periodic/semi-persistent/aperiodic transmission. CSI reporting setting 1610 can configure the UE to report one or more of the following by measuring the K CSI-RS resources configured by RS setting 1620. In one example of the indices of N selected CSI-RS resources from K CSI-RS resources, N can be one or more than one and the value can be configured in CSI reporting setting 1610. In another example pf the indices of up to N selected CSI-RS resources (selected from K CSI-RS resources), N can be one or more than one and the value can be configured by CSI reporting setting 1610.

In yet another example of the index of one CSI-RS resource (from the K CSI-RS resources) and a RSRP of the reported CSI-RS resource, the RSRP of a CSI-RS resource can be with normal resolution, low resolution, or high resolution. Some examples are illustrated in TABLES 1-4. In yet another example of the index of one CSI-RS resource (from the K CSI-RS resources) and a RSRQ of the reported CSI-RS resource. The RSRQ of a CSI-RS resource can be with normal resolution, low resolution, or high resolution. Some examples are illustrated in TABLES 5-9.

In yet another example of the indices of N CSI-RS resources (from the K CSI-RS resources) in a CSI report index (CRI) CRI=$\{C_{i1}, C_{i2}, \ldots, C_{iN}\}$. The CSI-RS resource indices in reported CRI=$\{C_{i1}, C_{i2}, \ldots, C_{iN}\}$ can be ordered according to relative RSRP or RSRQ information for the N reported CSI-RS resources. In such example, CSI-RS indices in CRI=$\{C_{i1}, C_{i2}, \ldots, C_{iN}\}$ are arranged in an ascending value order. A RSRP (or RSRQ, or CQI) of CSI-RS resource $C_{ij}$ is less than or equal to a RSRP (or RSRQ, or CQI) of CSI-RS resource $C_{i(j+1)}$, $1 \leq j < N$. The RSRP (or RSRQ, or CQI) of CSI-RS resource $C_{iN}$ is the largest among the N reported CSI-RS resources in CRI=$\{C_{i1}, C_{i2}, \ldots, C_{iN}\}$ and RSRP (or RSRQ, or CQI) of CSI-RS resource $C_{i1}$ is the smallest among the N reported CSI-RS resources in CRI=$\{C_{i1}, C_{i2}, \ldots, C_{iN}\}$. In such example, the CSI-RS indices in CRI=$\{C_{i1}, C_{i2}, \ldots, C_{iN}\}$ are sorted in a descending order. A RSRP (or RSRQ, or CQI) of CSI-RS resource $C_{ij}$ is larger than or equal to the RSRP (or RSRQ, or CQI) of CSI-RS resource $C_{i(j+1)}$, $1 \leq j < N$. The RSRP (or RSRQ, or CQI) of CSI-RS resource $C_{i1}$ is the largest among the N reported CSI-RS resources in CRI=$\{C_{i1}, C_{i2}, \ldots, C_{iN}\}$ and the RSRP (or RSRQ, or CQI) of CSI-RS resource $C_{iN}$ is the smallest among the N reported CSI-RS resources in CRI=$\{C_{i1}, C_{i2}, \ldots, C_{iN}\}$.

In yet another example, the UE can be configured to report a largest RSRP and smallest RSRP of N reported CSI-RS resources (or largest RSRQ and smallest RSRQ). The UE can be configured to report the largest and smallest RSRP values: $RSRP_{max}$ and $RSRP_{min}$. In such example, when the N CSI-RS resource indices in $\{C_{i1}, C_{i2}, \ldots, C_{iN}\}$ are arranged in ascending order, $RSRP_{min}$ can be the RSRP of CSI-RS resource $C_{i1}$ and $RSRP_{max}$ can be the RSRP pf CSI-RS resource $C_{iN}$ in the reported N CSI-RS resources $\{C_{i1}, C_{i2}, \ldots, C_{iN}\}$. In such example, when the N CSI-RS resource indices in $\{C_{i1}, C_{i2}, \ldots, C_{iN}\}$ are arranged in a descending order, $RSRP_{max}$ can be the RSRP of CSI-RS resource $C_{i1}$ and $RSRP_{min}$ can be the RSRP of CSI-RS resource $C_{iN}$ in the reported NCSI-RS resources $\{C_{i1}, C_{i2}, \ldots, C_{iN}\}$.

In yet another example, the UE can be configured to report largest RSRP and a mean/median RSRP of N reported CSI-RS resources (or largest RSRQ and mean/median RSRQ). In yet another example, the UE can be configured to report up to $N_{max}$ selected CSI-RS resources $\{C_{i1}, C_{i2}, \ldots, C_{iN}\}$, where $N \leq N_{max}$ and the RSRP or RSRQ of selected CSI-RS resources is equal to or larger than a RSRP or RSRQ threshold that can be configured to the UE by the NW. In yet another example, the UE can be configured to report up to $N_{max}$ CSI-RS resources $\{C_{i1}, C_{i2}, \ldots, C_{iN}\}$, where $N \leq N_{max}$ and the RSRP or RSRQ of selected CSI-RS resources is equal or less than a RSRP or RSRQ threshold that can be configured to the UE by the NW.

TABLE 1

RSRP values

| Reported value | Measured quantity value | Unit |
|---|---|---|
| RSRP_0 | RSRP < −140 | dBm |
| RSRP_1 | −140 ≤ RSRP < −139 | dBm |
| . . . | . . . | . . . |
| RSRP_97 | −44 ≤ RSRP | dBm |

TABLE 2

RSRP values

| Reported value | Measured quantity value | Unit |
|---|---|---|
| RSRP_0 | RSRP < −140 | dBm |
| RSRP_1 | −140 ≤ RSRP < −138 | dBm |
| . . . | . . . | . . . |
| RSRP_48 | −46 ≤ RSRP < −44 | |
| RSRP_49 | −44 ≤ RSRP | dBm |

TABLE 3

RSRP values

| Reported value | Measured quantity value | Unit |
|---|---|---|
| RSRP_0 | RSRP < −140 | dBm |
| RSRP_1 | −140 ≤ RSRP < −136 | dBm |
| . . . | . . . | . . . |
| RSRP_24 | −48 ≤ RSRP < −44 | dBm |
| RSRP_25 | −44 ≤ RSRP | dBm |

TABLE 4

| RSRP values | | |
|---|---|---|
| Reported value | Measured quantity value | Unit |
| RSRP_0 | RSRP < −140 | dBm |
| RSRP_1 | −140 ≤ RSRP < −135 | dBm |
| ... | ... | ... |
| RSRP_19 | −50 ≤ RSRP < −45 | dBm |
| RSRP_20 | −45 ≤ RSRP | dBm |

TABLE 5

| RSRQ values | | |
|---|---|---|
| Reported value | Measured quantity value | Unit |
| RSRQ_0 | RSRQ < −19.5 | dB |
| RSRQ_1 | −19.5 ≤ RSRQ < −19 | dB |
| ... | ... | ... |
| RSRQ_33 | −3.5 ≤ RSRQ < −3 | dB |
| RSRQ_34 | −3 ≤ RSRQ | dB |

TABLE 6

| RSRQ values | | |
|---|---|---|
| Reported value | Measured quantity value | Unit |
| RSRQ_0 | RSRQ < −20 | dB |
| RSRQ_1 | −20 ≤ RSRQ < −19 | dB |
| ... | ... | ... |
| RSRQ_17 | −4 ≤ RSRQ < −3 | dB |
| RSRQ_18 | −3 ≤ RSRQ | dB |

TABLE 7

| RSRQ values | | |
|---|---|---|
| Reported value | Measured quantity value | Unit |
| RSRQ_0 | RSRQ < −20 | dB |
| RSRQ_1 | −20 ≤ RSRQ < −18 | dB |
| ... | ... | ... |
| RSRQ_10 | −4 ≤ RSRQ < −2 | dB |
| RSRQ_11 | −2 ≤ RSRQ | dB |

TABLE 8

| RSRQ values | | |
|---|---|---|
| Reported value | Measured quantity value | Unit |
| RSRQ_0 | RSRQ < −20 | dB |
| RSRQ_1 | −20 ≤ RSRQ < −17 | dB |
| ... | ... | ... |
| RSRQ_6 | −5 ≤ RSRQ < −2 | dB |
| RSRQ_7 | −2 ≤ RSRQ | dB |

TABLE 9

| RSRQ values | | |
|---|---|---|
| Reported value | Measured quantity value | Unit |
| RSRQ_0 | RSRQ < −20 | dB |
| RSRQ_1 | −20 ≤ RSRQ < −15 | dB |
| ... | ... | ... |

TABLE 9-continued

| RSRQ values | | |
|---|---|---|
| Reported value | Measured quantity value | Unit |
| RSRQ_3 | −10 ≤ RSRQ < −5 | dB |
| RSRQ_4 | −5 ≤ RSRQ | dB |

In one embodiment, the K CSI-RS resources configured by RS setting 1620 can be for periodic CSI-RS transmission. CSI reporting setting 1610 can configure the UE to report the RSRP (or RSRQ) of one CSI-RS resource. In one example, CSI reporting setting 1610 can configure a CSI-RS resource index to the UE and the UE can be requested to report the RSRP (or RSRQ) for a CSI-RS transmission in the CSI-RS resource having the configured index. The CSI reporting setting can signal one CSI-RS resource index $C_0$ from the K CSI-RS resources configured in RS setting 1620. The UE can be requested to report the RSRP (or RSRQ) the UE measures at CSI-RS resource $C_0$.

In another example, CSI reporting setting 1610 can configure the UE to report a RSRP (or RSRQ) for one indicated CSI-RS resource and the index of one CSI-RS resource can be signaled through MAC-CE or L1 signaling. The UE can be requested to report a RSRP or RSRQ corresponding to the CSI-RS resource indicated by the MAC-CE or L1 signaling.

The aforementioned embodiments can be used by a NW to configure a UE to monitor and report a beam quality of one particular TRP Tx beam, for example, one coverage beam, periodically so that the NW can track the beam coverage of the UE and switch the UE to a new coverage beam when the NW deems necessary.

In one embodiment, the K CSI-RS resources configured by RS setting 1620 can be periodic transmission. CSI reporting setting 1610 can configure the UE to report the RSRP (or RSRQ) of a subset of indicated CSI-RS resources. In one example, CSI reporting setting 1610 can signal a subset of M CSI-RS resource indices $\{C_{i1}, C_{i2}, \ldots, C_{iM}\}$ out of K configured CSI-RS resources and the UE can be requested to report: RSRP (or RSRQ) of those M indicated CSI-RS resources $\{C_{i1}, C_{i2}, \ldots, C_{iM}\}$; largest RSRP (or RSRQ) and smallest RSRP (or RSRQ) of the M indicated CSI-RS resources $\{C_{i1}, C_{i2}, \ldots, C_{iM}\}$; and/or largest RSRP (or RSRQ) and mean/median RSRP (or RSRQ) of the M indicated CSI-RS resources $\{C_{i1}, C_{i2}, \ldots, C_{iM}\}$.

In one embodiment, RS setting 1620 configures the RS type to be NR-SS. The UE can be configured to measure a NR-SSS block and report an index and an associated RSRP for one or more NR-SS blocks.

In one embodiment, two CSI-RS resource sets are configured in RS setting 1620. A first CSI-RS resource set has $K_A$ CSI-RS resources and a second CSI-RS resource set has $K_B$ CSI-RS resources. CSI reporting setting 1610 can configure the UE to report one pair of CSI-RS resource $\{C_{iA}, C_{iB}\}$, where $C_{iA}$ is index of a CSI-RS resource selected from a first CSI-RS resource set with $K_A$ CSI-RS resources configured in RS setting 1620 and $C_{iB}$ is index of a CSI-RS resource selected from a second CSI-RS resource set with $K_B$ CSI-RS resource configured RS setting 1620 and the UE can be requested to select $C_{iA}$ and $C_{iB}$ that are QCLed to a same UE Rx beam or can be received simultaneously.

In one embodiment, CSI reporting setting 1610 can configure the UE to report a subset of N>=1 pairs of CSI-RS resources $\{\{C_{iA,1}, C_{iB,2}\}, \{C_{iA,2}, C_{iB,2}\}, \ldots, \{C_{iA,N}, C_{iB,N}\}\}$. In one example of each reported pair, the CSI-RS resource $C_{iA,j}$ is selected from a first CSI-RS resource set configured in RS setting 1620 and the CSI-RS resource is selected from a second CSI-RS resource set configured in RS setting 1620, where j=1, 2, ..., N. In each reported pair, the CSI-RS resource $C_{iA,j}$ and the CSI-RS $C_{iB,j}$ are QCLed to the same UE Rx beam mode.

In another example, the ordering information in $\{\{C_{iA,1}, C_{iB,1}\}, \{C_{iA,2}, C_{iB,2}\} \ldots \{C_{iA,N}, C_{iB,N}\}\}$ can indicate the ordering of the sum of RSRP (or, RSRQ) of two CSI-RS resource in each reported CSI-RS resource pair. In one example, the pairs in $\{\{C_{iA,1}, C_{iB,1}\}, \{C_{iA,2}, C_{iB,2}\}, \ldots \{C_{iA,N}, C_{iB,N}\}\}$ are in an ascending order. The sum of RSRPs for CSI-RS resources $C_{iA,j}$ and $C_{iB,j}$ is smaller or equal to the sum of RSRP of CSI-RS resources $C_{iA,j+1}$ and $C_{iB,j+1}$, $1 \leq j < N$. The sum of RSRP of CSI-RS resource $C_{iA,N}$ and $C_{iB,N}$ is the largest RSRP sum in the reported pair subset. In one instance, the pairs in $\{\{C_{iA,1}, C_{iB,2}\}, \{C_{iA,2}, C_{iB,2}\}, \ldots, \{C_{iA,N}, C_{iB,N}\}\}$ are in a descending order. The sum of RSRPs for CSI-RS resource $C_{iA,j}$ and $C_{iB,j}$ is greater or equal to the sum of RSRP of CSI-RS resource $C_{iA,j+1}$ and $C_{iB,j+1}$ $C_{iB,j+1}$, $1 \leq j < N$. The sum of RSRPs for CSI-RS resources $C_{iA,1}$ and $C_{iB,1}$ is the largest RSRP sum in the reported pair subset.

In yet another example, the UE can be requested to report the largest sum of RSRPs for reported CSI-RS resource pair and/or the smallest sum of RSRPs for reported CSI-RS resource pair and/or the mean/median sum of RSRPs for reported CSI-RS resource pairs in $\{\{C_{iA,1}, C_{iB,2}\}, \{C_{iA,2}, C_{iB,2}\}, \ldots, \{C_{iA,N}, C_{iB,N}\}\}$.

Figure 17:
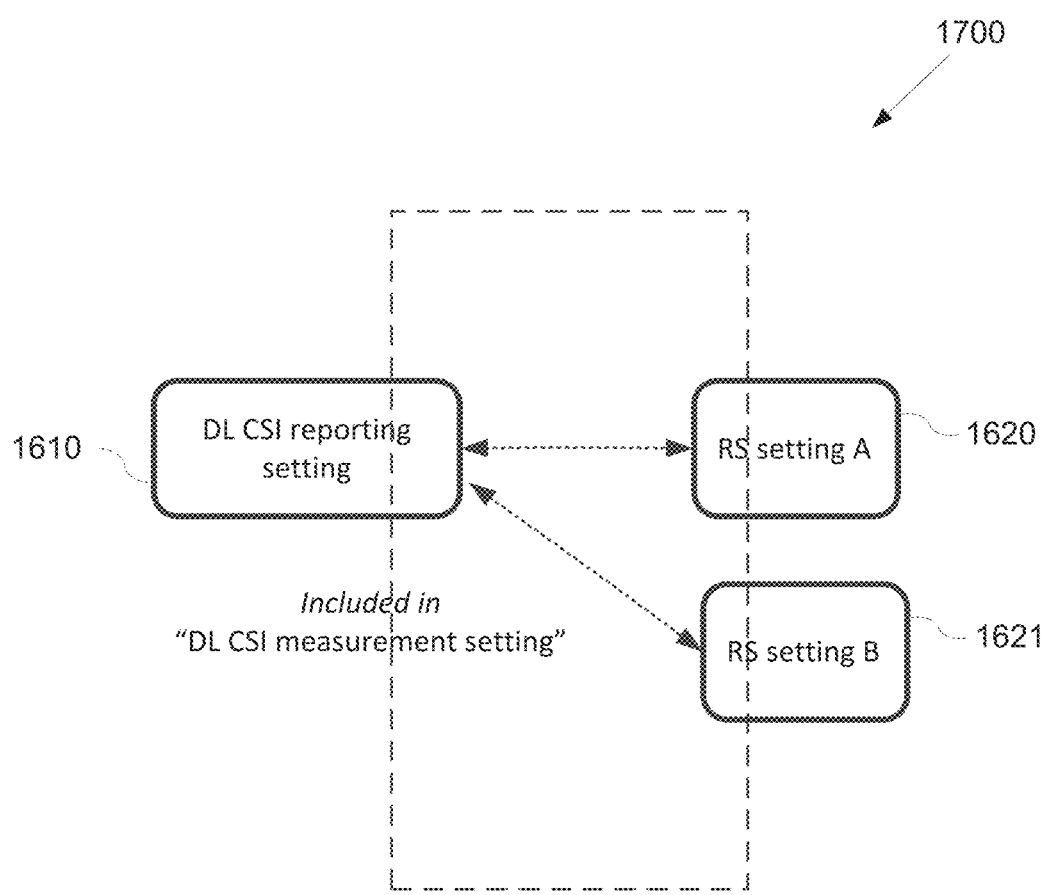
FIG. 17 illustrates yet another example CSI reporting setting according to embodiments of the present disclosure.

FIG. 17 illustrates yet another example CSI reporting setting 1700 according to embodiments of the present disclosure. The embodiment of the CSI reporting setting 1700 illustrated in FIG. 17 is for illustration only. FIG. 17 does not limit the scope of this disclosure to any particular implementation.

In one embodiment, a UE is configured with a CSI reporting setting 1610 and two RS settings: RS setting A 1620 and RS setting B 1621 for beam measurement and reporting. CSI reporting setting 1610 is linked with RS setting A 1620 and RS setting B 1621 in CSI measurement setting, as shown in FIG. 17. Here, having two RS settings linked to a CSI reporting setting is exemplary for illustrative purposes. Other values can also be used to represent the described functionalities. RS setting A 1620 can configure $K_A$ CSI-RS resources and RS setting B 1621 can configure $K_B$ CSI-RS resources. CSI reporting setting 1610 can configure beam state information parameters that a UE can be configured to measure and report. After receiving a signaling informing of a CSI reporting setting 1610, RS setting 1620 and 1621, the UE can be requested to measure, calculate, and report beam state information parameters over the CSI-RS resources configured in RS setting A 1620 and B 1621, as configured in CSI reporting setting 1610.

In one embodiment, the UE can be configured to report indices of $N_A$ CSI-RS resources from $K_A$ CSI-RS resources configured by RS setting A 1620 and indices of $N_B$ CSI-RS resources from $K_B$ CSI-RS resources configured by RS setting 1621. The values of $N_A$ and $N_B$ can be signaled as part of the CSI reporting setting 1610.

In one embodiment, the UE can be configured to report indices of N CSI-RS resources from $K_A$ CSI-RS resources configured by RS setting A 1620 and indices of N CSI-RS resources selected from $K_B$ CSI-RS resources configured by RS setting 1621. The value of N can be signaled as part of the CSI reporting setting 1610.

In one embodiment, the UE can be configured to report the largest RSRP for a CSI-RS resource of the reported CSI-RS resources selected from RS setting A and the largest RSRP for a CSI-RS resource of the reported CSI-RS resources selected from RS setting B.

In one embodiment, the UE can be configured to report the smallest RSRP or mean/median RSRP of reported CSI-RS resources of each RS setting.

In one method, CSI reporting setting 1610 can configure a UE to report an index of one CSI-RS resource group and the indices of one or more CSI-RS resources from a CSI-RS resource group. In one example, a CSI reporting setting 1610 can configure the subframe/slot periodicity and offset for reporting the index of one RS setting. In the method of FIG. 17, the $K_A$ CSI-RS resources configured by RS setting A 1620 correspond to a first CSI-RS resource group and the $K_B$ CSI-RS resources configured by RS setting B 1621 correspond to a second CSI-RS resource group. Reporting index of one RS setting corresponds to reporting index of one CSI-RS resource group.

In one example, a CSI reporting setting 1610 can configure the subframe/slot periodicity and offset for reporting the indices of N CSI-RS resources from the reported CSI-RS resource group and/or corresponding RSRP (or RSRQ) of reported CSI-RS resources.

In one example, a CSI reporting setting 1610 can configure that the UE can be requested to report a RS setting with lower duty cycle and then report N selected CSI-RS resource indices from the reported RS setting with higher duty cycle.

In one embodiment CSI reporting setting 1610 can configure the UE to report one pair of CSI-RS resource $\{C_{iA}, C_{iB}\}$, where $C_{iA}$ is index of a CSI-RS resource selected from $K_A$ CSI-RS resources configured RS setting A 1620 and $C_{iB}$ is index of a CSI-RS resource selected from $K_B$ CSI-RS resource configured RS setting B 1621. The UE can be requested to select $C_{iA}$ and $C_{iB}$ that are QCLed to a same UE Rx beam mode.

In one embodiment, CSI reporting setting 1610 can configure the UE to report a subset of N pairs of CSI-RS resources $\{\{C_{iA,1}, C_{iB,2}\}, \{C_{iA,2}, C_{iB,2}\}, \ldots, \{C_{iA,N}, C_{iB,N}\}\}$. In one example of each reported pair, the CSI-RS resource $C_{iA,j}$ is selected from $K_A$ CSI-RS resources configured in RS setting A 1620 and the CSI-RS resource is selected from $K_B$ CSI-RS resources configured in RS setting B 1621, where j=1, 2, ..., N. In each reported pair, the CSI-RS resource $C_{iA,j}$ and the CSI-RS $C_{iB,j}$ are QCLed to the same UE Rx beam mode.

In another example, the ordering information in $\{\{C_{iA,1}, C_{iB,2}\}, \{C_{iA,2}, C_{iB,2}\}, \ldots, \{C_{iA,N}, C_{iB,N}\}\}$ can indicate the ordering of the sum of RSRP (or, RSRQ) of two CSI-RS resource in each reported CSI-RS resource pair. In one example, the pairs in $\{\{C_{iA,1}, C_{iB,2}\}, \{C_{iB,2}\}, \ldots \{C_{iA,N}, C_{iB,N}\}\}$ are in an ascending order. The sum of RSRPs for CSI-RS resources $C_{iA,j}$ and $C_{iB,j}$ is smaller or equal to the sum of RSRP of CSI-RS resources $C_{iA,j+1}$ and $C_{iB,j+1}$, $1 \leq j < N$. The sum of RSRP of CSI-RS resource $C_{iA,N}$ and $C_{iB,N}$ is the largest RSRP sum in the reported pair subset. In one example, the pairs in $\{\{C_{iA,1}, C_{iB,2}\}, \{C_{iA,2}, C_{iB,2}\}, \ldots, \{C_{iA,N}, C_{iB,N}\}\}$ are in a descending order. The sum of RSRPs for CSI-RS resource $C_{iA,j}$ and $C_{iB,j}$ is greater or equal to the sum of RSRP of CSI-RS resource $C_{iA,j+1}$ and $C_{iB,j+1}$ $C_{iB,j+1}$, $1 \leq j < N$. The sum of RSRPs for CSI-RS resources $C_{iA,1}$ and $C_{iB,1}$ is the largest RSRP sum in the reported pair subset.

In yet another example, the UE can be requested to report the largest sum of RSRPs for reported CSI-RS resource pair and/or the smallest sum of RSRPs for reported CSI-RS resource pair and/or the mean/median sum of RSRPs for reported CSI-RS resource pairs in $\{C_{iA,1}, C_{iB,2}\}, \{C_{iA,2}, C_{iB,2}\}, \ldots, \{C_{iA,N}, C_{iB,N}\}$.

In one embodiment, CSI reporting configuration 1610 can configure the UE to measure and report one or more CSI-RS resource indices from one indicated RS setting. An index of RS setting (that can be RS setting A or B in the above example) can be signaled to the UE through MAC-CE or L1 signaling. The UE can be requested to report indices of N CSI-RS resources selected from the $K_A$ or $K_B$ CSI-RS resources configured through the indicated RS setting.

In one embodiment, RS setting A 1620 can configure $K_A$ CSI-RS resources and can configure that $K_A$ CSI-RS resources are QCLed for spatial information, and RS setting B 1621 can configure $K_B$ CSI-RS resources and can configure that $K_B$ CSI-RS resources are QCLed for spatial information. CSI reporting setting 1610 can configure the UE to report one or more of the following: RSRP of one CSI-RS resource from the $K_A$ CSI-RS resources configured in RS setting A and RSRP of one CSI-RS resource from the $K_B$ CSI-RS resources configured in RS setting B; one index of RS setting (from RS setting A and B) and RSRP for one CSI-RS resource from CSI-RS resources configured by the reported RS setting; and/or an index of Rx beam mode from the reported RS setting.

When receiving the configuration, the UE can be configured to apply different Rx beams over CSI-RS resources configured by a RS setting by assuming the CSI-RS resources are QCLed for spatial information. The UE can apply different Rx beams on different CSI-RS resources and then measure a RSRP for each CSI-RS resource to select the best Rx beams. Through this method, joint P-2 and P-3 procedure can be achieved. The NW can apply different TRP Tx beams on the CSI-RS resources configured by different RS settings and apply a same TRP Tx beam on CSI-RS resources configured by one RS setting.

The number of RS settings being two is exemplary in the present disclosure. Other numbers of RS setting can also be used to represent the same functionality.

Figure 18:
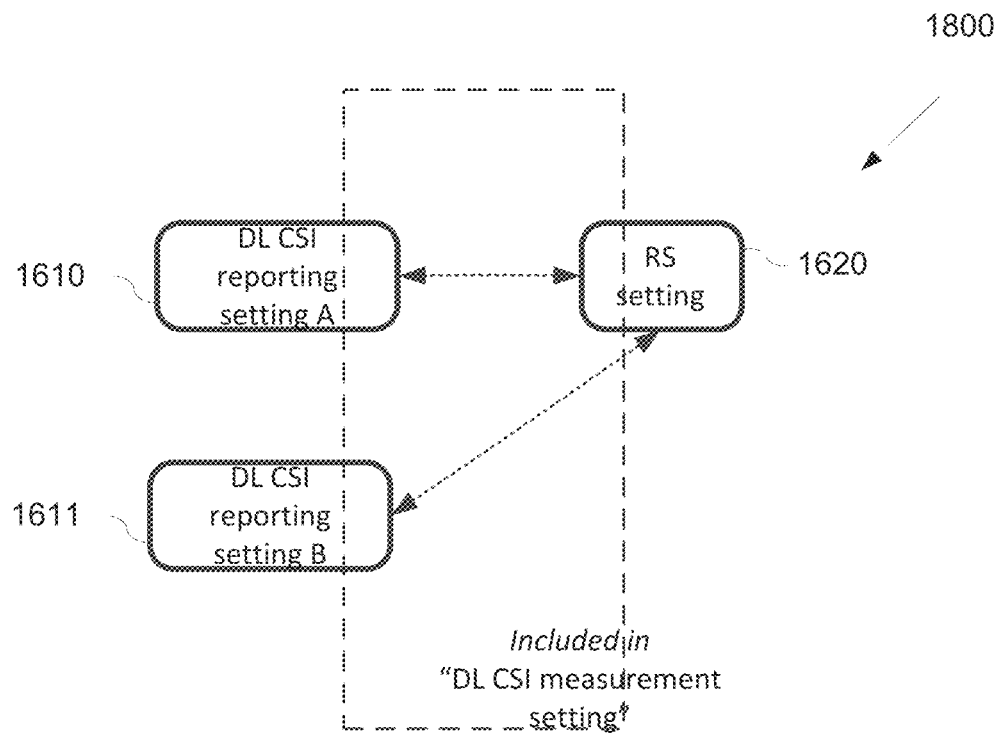
FIG. 18 illustrates yet another example CSI reporting setting according to embodiments of the present disclosure.

FIG. 18 illustrates yet another example CSI reporting setting 1800 according to embodiments of the present disclosure. The embodiment of the CSI reporting setting 1800 illustrated in FIG. 18 is for illustration only. FIG. 18 does not limit the scope of this disclosure to any particular implementation.

In one embodiment, a UE can be configured with two CSI reporting settings, CSI reporting setting A 1610 and CSI reporting setting B 1611, and RS setting 1620 for beam measurement and reporting. CSI reporting setting A 1610 and CSI reporting setting B 1611 are linked with RS setting 1620 in CSI measurement setting, as shown in FIG. 18. Here, the number of two CSI reporting settings linked to a RS setting is exemplary and only for illustrative purposes. Other values can also be used to represent the functionalities.

As shown in FIG. 18, RS setting 1620 can configure K CSI-RS resources for CSI-RS transmission to a UE. When receiving CSI reporting A 1610, the UE can be configured to calculate and report beam state information parameters configured by CSI reporting A 1610 by measuring on CSI-RS resources configured in RS setting 1620. When receiving CSI reporting B 1611, the UE can be requested to calculate and report beam state information parameters configured by CSI reporting B 1611 by measuring on CSI-RS resources configured in RS setting 1620.

In one embodiment, as shown in FIG. 18, RS setting 1620 can configure K CSI-RS resources for CSI-RS transmission to a UE. The CSI reporting setting A 1610 can configure the UE to report the indices of N CSI-RS resources and/or RSRP (or RSRQ) as described in previous embodiments. The CSI reporting setting B 1611 can configure the UE to monitor and report the RSRP (or RSRQ) of one or more indicated CSI-RS resources as described in previous embodiments.

Figure 19:
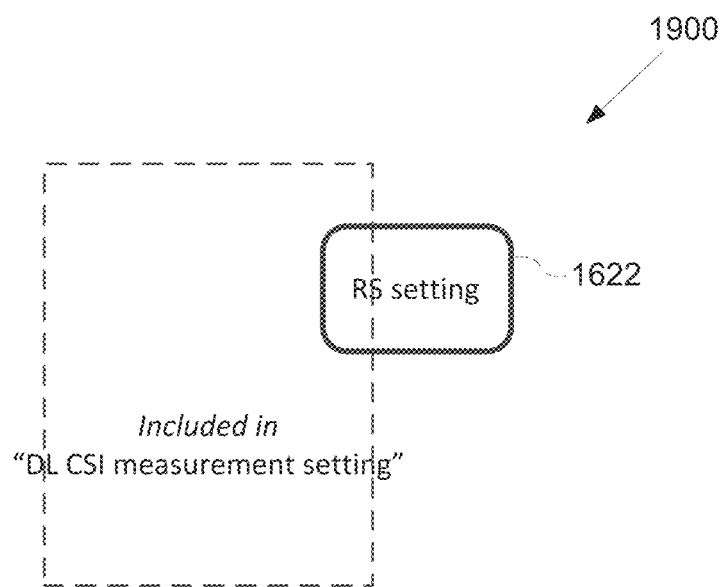
FIG. 19 illustrates yet another example CSI reporting setting according to embodiments of the present disclosure.

FIG. 19 illustrates yet another example CSI reporting setting 1900 according to embodiments of the present disclosure. The embodiment of the CSI reporting setting 1900 illustrated in FIG. 19 is for illustration only. FIG. 19 does not limit the scope of this disclosure to any particular implementation.

In one embodiment, a UE can be configured a RS setting 1622 for beam measurement and reporting. A RS setting 1622 is not linked with any CSI reporting CSI measurement setting, as shown in FIG. 19. The UE can be indicated CSI-RS resources for CSI-RS transmission by RS setting 1622. The UE can measure the CSI-RS resources without an associated reporting to the NW.

In one embodiment, as shown in FIG. 19, the RS setting 1622 can configure K CSI-RS resources. CSI-RS transmission on the K CSI-RS resources can be periodic, semi-persistent, or aperiodic. There is no CSI reporting setting linked to RS setting 1622. The UE can assume that no CSI or beam state information reporting is needed for the measurement on CSI-RS resources configured by RS setting 1622. The UE can perform measurements based on the configuration of CSI-RS resources. In one example, the RS setting 1622 can indicate that the CSI-RS resources are QCLed for spatial information. The UE can apply different Rx beam modes to receive different CSI-RS resources and then select an Rx beam mode.

Figure 20:
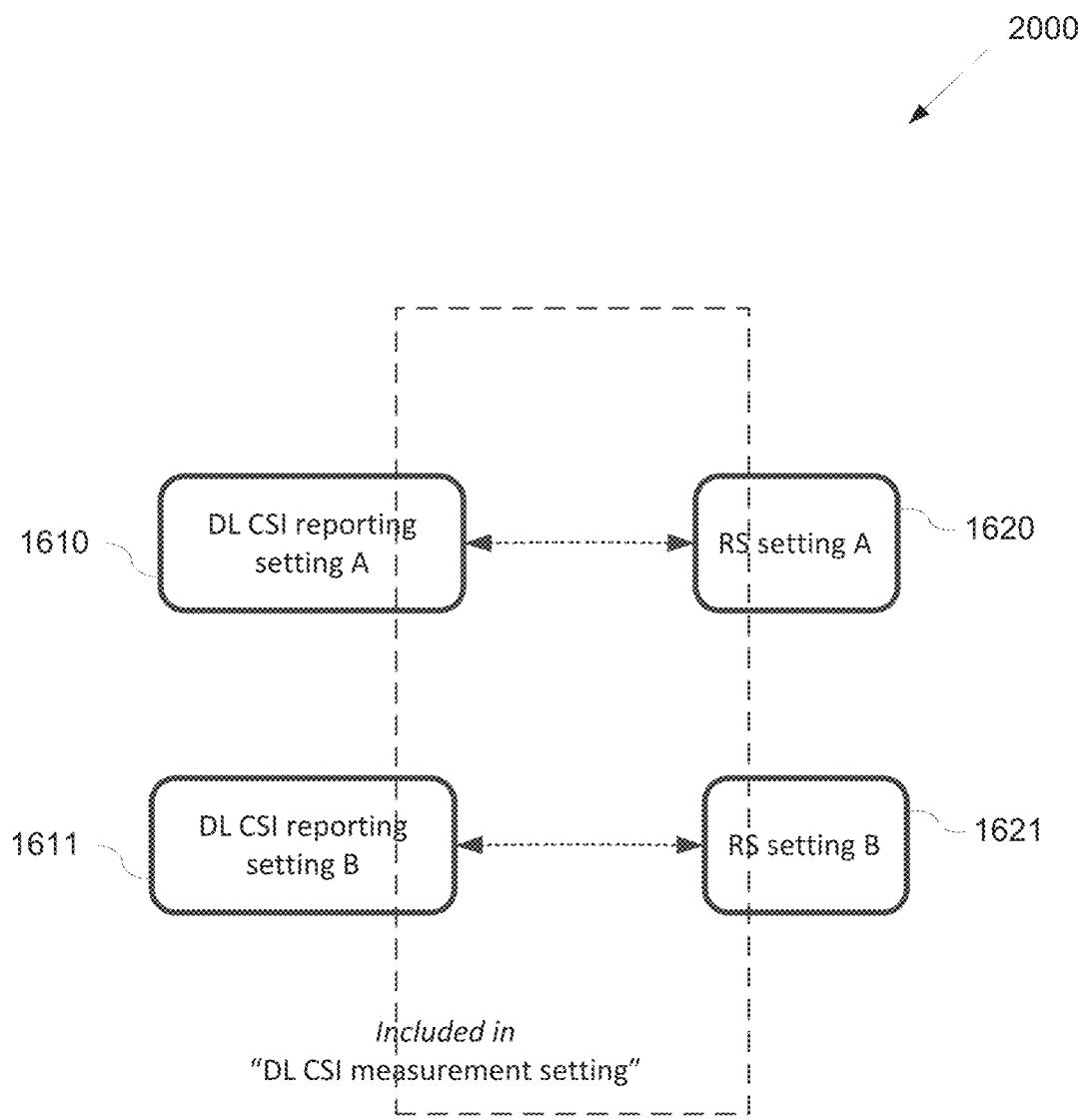
FIG. 20 illustrates another example CSI reporting setting according to embodiments of the present disclosure.

FIG. 20 illustrates another example CSI reporting setting 2000 according to embodiments of the present disclosure. The embodiment of the CSI reporting setting 2000 illustrated in FIG. 20 is for illustration only. FIG. 20 does not limit the scope of this disclosure to any particular implementation.

In one embodiment, as shown in FIG. 20, a UE can be configured with CSI reporting setting A 1610, CSI reporting setting B 1611, a RS setting A 1620 and RS setting B 1621 for beam measurement and reporting, as illustrated in FIG. 20. A CSI reporting setting A 1610 is linked with a RS setting A 1620 and a CSI reporting setting B 1611 is linked with a RS setting B 1621 in a CSI measurement setting.

In one method, a as shown in FIG. 20, CSI reporting setting B 1611 can configure a UE that the TRP Tx beam direction applied to CSI-RS transmission on CSI-RS resources configured in RS setting B 1621 is restricted to a direction of a CSI-RS resource out of $K_A$ CSI-RS resources configured by RS setting A. The CSI reporting setting B 1611 can signal an index, $C_A$, of one CSI-RS resource selected from the $K_A$ CSI-RS resources configured by RS setting A to the UE. The UE can assume the TRP Tx beam direction applied to the $K_B$ CSI-RS resources configured by RS setting B is restricted to the direction of TRP Tx beam applied to the CSI-RS resource $C_A$.

In one embodiment, an RS setting B can indicate that the $K_B$ CSI-RS resources are QCLed for spatial information to a CSI-RS resource $C_A$ from the CSI-RS resources configured by RS setting A. The indication can be signaled in MAC-CE or L1 signaling. In one example, CSI-RS transmission on CSI-RS resources configured by RS setting B 1621 is semi-persistent. The QCL information for CSI-RS resource $C_A$ can be signaled by a field in the activation message and the UE can assume that TRP Tx beams applied to CSI-RS resources in semi-persistent transmission are QCLed to the beam direction of CSI-RS resources $C_A$ configured by RS setting A 1620 and then the UE can choose Rx beam modes. In one example, CSI-RS transmission on CSI-RS resources configured RS setting B 1621 is aperiodic. The QCL information for CSI-RS resource $C_A$ can be signaled by a field in the trigger message and the UE can assume the TRP Tx beams applied to CSI-RS resources in aperiodic transmission are QCLed to the beam direction of CSI-RS resources $C_A$ configured by RS setting A 1620 and then the UE can choose Rx beam modes.

In one embodiment, CSI reporting configured by CSI reporting setting B 1611 can be aperiodic. In the trigger message of a CSI reporting, a field of one or more CSI-RS resource indices can be signaled to indicate a TRP Tx beam direction restriction on CSI-RS resources that the UE is configured to calculate and measure the beam state information parameters.

In one embodiment, beam management and CSI acquisition can be operated concurrently for a UE. A UE can be configured with K RS resources. For instance, the configured RS resources can be CSI-RS where multiple CSI-RS resources can be used for CSI-RS transmission and each CSI-RS resource can correspond to one Tx beam. The beam management and CSI acquisition can be operated concurrently on the CSI-RS transmission in those K configured CSI-RS resources.

In one embodiment, a DL CSI framework for a UE can include at least one RS setting, at least one CSI reporting setting and one CSI measurement setting. A RS setting can configure a UE with K CSI-RS resources where the CSI-RS transmission can be used for both measurement and beam state information calculation for beam management, and measurement and CSI calculation for CSI acquisition. A CSI reporting setting can configure a UE with CSI reporting parameters and beam state information reporting parameters. A CSI measurement setting can link CSI reporting setting and RS setting. The beam state information can include CRI-RS resource group index, CRI, CRI-1, CRI-2, RSRP/RSRQ/CQI of CSI-RS resource group, RSRP/RSRQ/CQI of CSI-RS resource.

In one embodiment, CSI reporting parameters and beam state information reporting parameters can be configured using two different CSI reporting settings, a first CSI reporting setting and a second CSI reporting setting, respectively. CSI measurement setting can link the RS setting that configures CSI-RS resources where CSI-RS transmission can be used for both beam management and CSI acquisition and a first CSI reporting setting and a second CSI reporting setting.

In another embodiment, CSI reporting parameters and beam state information reporting parameters can be configured in a CSI reporting setting. CSI measurement setting can link the RS setting that configures CSI-RS resources where CSI-RS transmission can be used for both beam management and CSI acquisition and a CSI reporting setting that can configure both CSI reporting parameters and beam state information reporting parameters.

Figure 21:
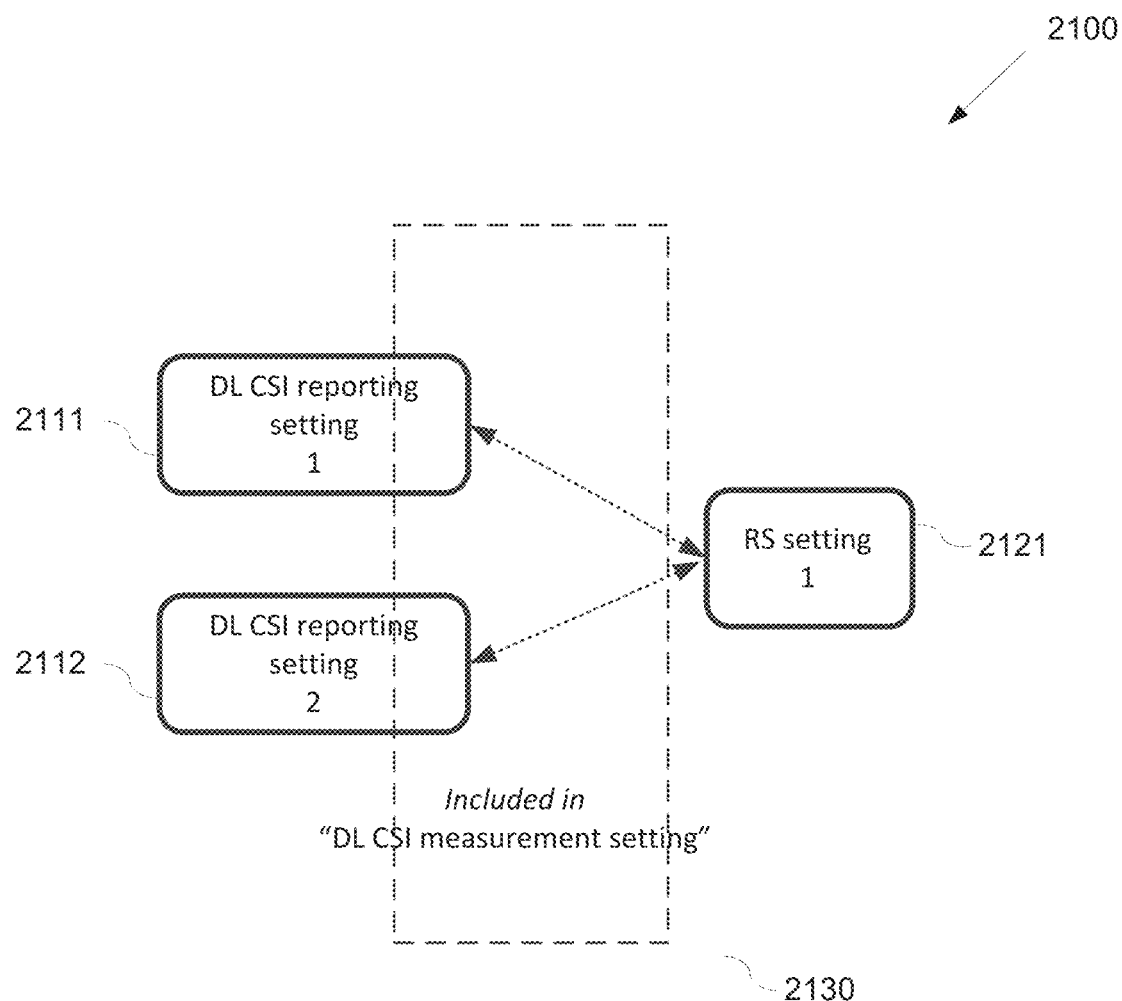
FIG. 21 illustrates another example CSI reporting setting according to embodiments of the present disclosure.

FIG. 21 illustrates another example CSI reporting setting 2100 according to embodiments of the present disclosure. The embodiment of the CSI reporting setting 2100 illustrated in FIG. 21 is for illustration only. FIG. 21 does not limit the scope of this disclosure to any particular implementation.

In one example of FIG. 21, a DL CSI framework for a UE can include one RS setting 1 (2121) and two DL CSI reporting settings 1 and 2 (2111 and 2112). RS setting 1 (2121) can configure K CSI-RS resources for measurement and CSI calculation and for measurement and beam state information calculation. CSI reporting setting 1 (2111) configures CSI reporting parameters that the UE needs to calculate and report, and CSI reporting setting 2 (2112) configures beam state information reporting parameters that the UE needs to calculate and report. RS setting 1 (2121) is linked with CSI reporting setting 1 (2111) and CSI reporting setting 2 (2112) in CSI measurement setting 2130.

Figure 22:
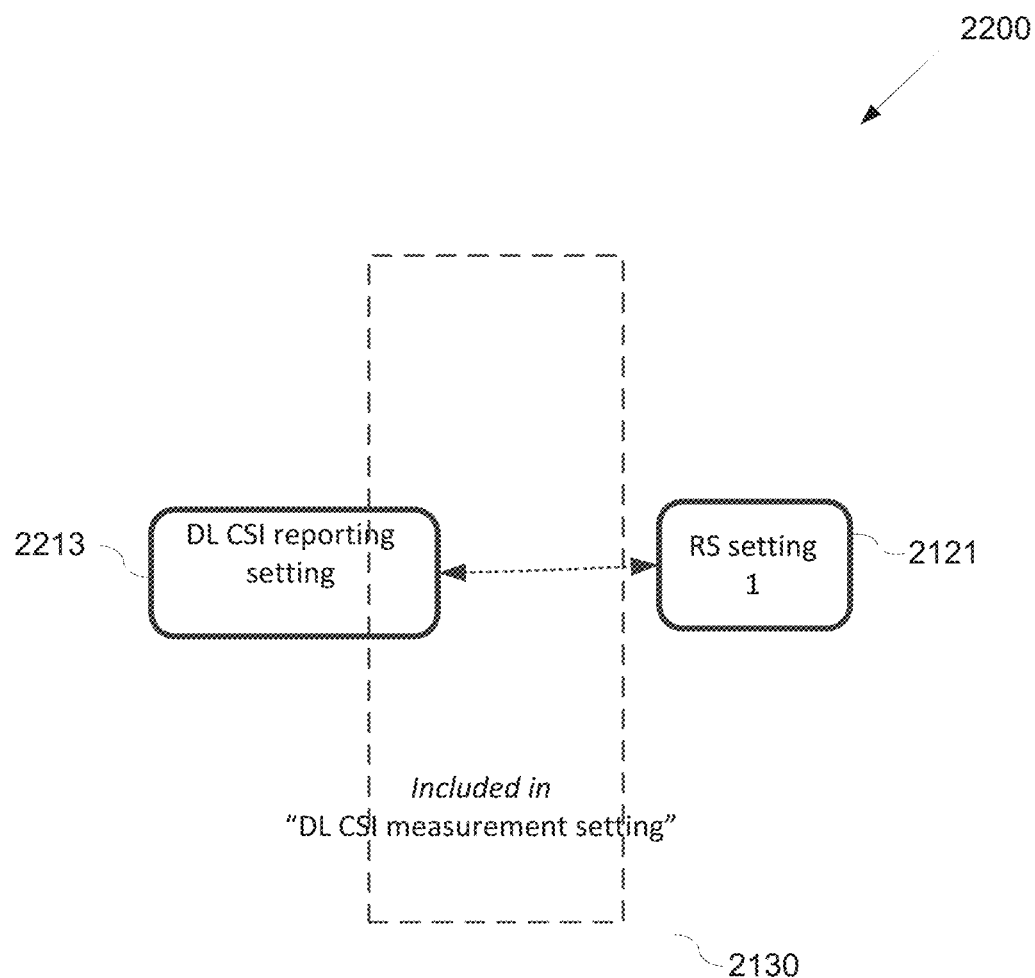
FIG. 22 illustrates another example CSI reporting setting according to embodiments of the present disclosure.

FIG. 22 illustrates another example CSI reporting setting 2200 according to embodiments of the present disclosure. The embodiment of the CSI reporting setting 2200 illustrated in FIG. 22 is for illustration only. FIG. 22 does not limit the scope of this disclosure to any particular implementation.

In one example of FIG. 22, a DL CSI framework for a UE can include one RS setting 1 (2121) and one DL CSI reporting settings 2213. RS setting 1 (2121) can configure K CSI-RS resources for measurement and CSI calculation and for measurement and beam state information calculation. CSI reporting setting 2213 configures CSI reporting parameters and beam state information reporting parameters that the UE needs to calculate and report. RS setting 1 (2121) is linked with CSI reporting setting 2213 in CSI measurement setting 2130.

An RS setting configures K CSI-RS resources that can be used by a UE to calculate CSI reporting parameters and beam state information parameters. A RS setting can include CSI-RS grouping information that can divide the K CSI-RS resources into one or more CSI-RS group (or set). A RS setting can include one or more of the following configurations. In one example of K CSI-RS resources and the indices of those K CSI-RS resources, one example of indices of CSI-RS resources can be $\{0, 1, \ldots, K-1\}$. In another example of the number of CSI-RS resource groups (or sets), S, the indices of CSI-RS resource group can be $\{0, 1, \ldots, S-1\}$. In yet another example of the number of CSI-RS resources in every CSI-RS resource group, $K_0, K_1, \ldots, K_{S-1}$, where we can have $K_i \geq 1$ for $i=0, 1, \ldots, S-1$.

In yet another example of the composition of each CSI-RS resource group that configures the CSI-RS resources in every CSI-RS resource group, CSI-RS resource group $i$ contains $K_i$ CSI-RS resources from K configured CSI-RS resources. In one instance, CSI-RS resource group 0 can contain CSI-RS resources $\{c_{0,0}, c_{0,1}, \ldots, c_{0,K_0-1}\}$ Selected from CSI-RS Resources $\{0, 1, \ldots, K-1\}$, CSI-RS resource group 1 can contain CSI-RS resources $\{c_{1,0}, c_{1,1}, \ldots, c_{1,K_1-1}\}$ selected from CSI-RS resources $\{0, 1, \ldots, K-1\}$, and so on. One of the K CSI-RS resources can be included in two or more than two CSI-RS resource groups. Two or more than two CSI-RS resource groups can have some overlap on the selection of CSI-RS resources.

An RS setting can configure a time-domain repetition to one CSI-RS resource. One example of the time-domain repetition of one CSI-RS resource can be that one CSI-RS resource contains multiple consecutive OFDM symbols so that the CSI-RS transmission can be repeated along those consecutive OFDM symbols. One example of the time-domain repetition of one CSI-RS resource can be IFDMA in which the CSI-RS signal can be mapped every Z subcarriers so that there are Z signal repetition along time within one reference OFDM symbol. One example of the time-domain repetition of one CSI-RS resource can be Z time larger subcarrier spacing (or shorter OFDM symbol) so that there can be Z shorter symbols within one reference OFDM symbol and the CSI-RS transmission can be repeated across those Z shorter symbols. In one embodiment, the time-domain repetition can be configured and signaled by a hybrid method. The configuration of time-domain repetition can be signaled through higher layers (e.g., by an RRC message) and configuration of every CSI-RS transmission can be signaled through a MAC-CE or by L1 signaling.

In one embodiment, a RS setting configures the time-domain repetition to one CSI-RS resource. The configuration can include: the resource configuration of a CSI-RS resource when time-domain repetition is used, for example the number and indices of antenna ports and the OFDM symbol index; the method of time-domain repetition; the number of OFDM symbols, Z if the time-domain repetition of multiple consecutive OFDM symbol is used; the IFDMA factor Z, where CSI-RS is mapped every Z subcarriers if the IFDMA method is used; the subcarrier spacing and CP scale factor Z, where the subcarrier spacing is Z times of reference subcarrier spacing and CP length is 1/Z of reference CP length; and/or the subcarrier spacing scale factor $Z_1$ and CP scale factor $Z_2$.

The aforementioned configuration of presence or absence of time-domain repetition can be signaled in higher layers (e.g., by RRC message). And whether time-domain repetition is used in one particular CSI-RS transmission on the configured CSI-RS resource can be dynamically signaled through a MAC-CE and/or by a L1 signaling, for example through 1 bit flag field to indicate the time-domain repetition. In one example, CSI-RS resource configured by a RS setting can be semi-persistent and 1 bit filed indicating whether the time-domain repetition is used can be signaled in a MAC-CE or by L1 signaling in a corresponding activation message. In one example, CSI-RS resource configured by a RS setting can have aperiodic transmission and the 1 bit field indicating whether the time-domain repetition is used can be signaled by MAC-CE or L1 signaling in trigger message for an aperiodic transmission.

Figure 23:
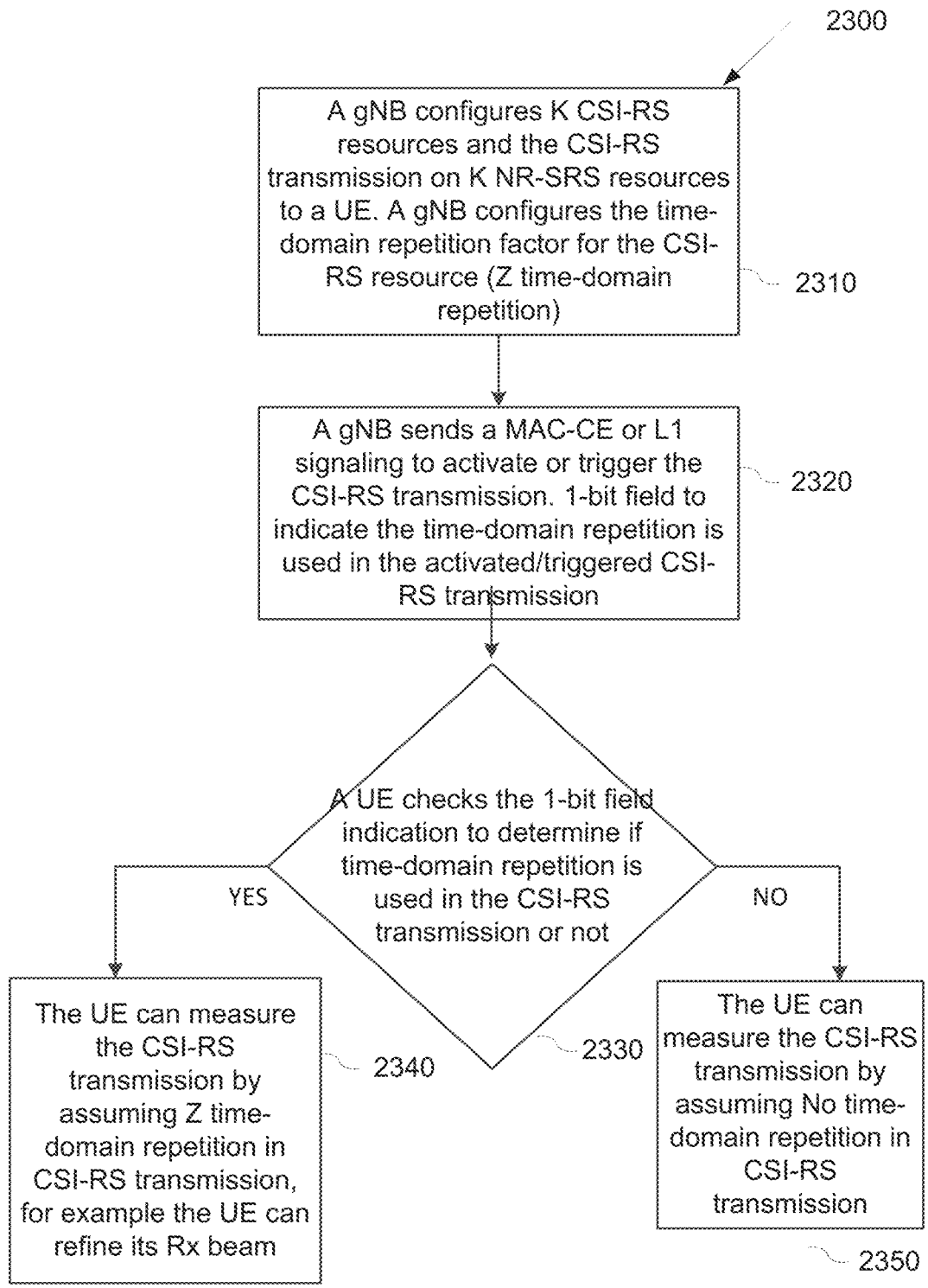
FIG. 23 illustrates an example concurrent beam management and CSI acquisition according to embodiments of the present disclosure.

FIG. 23 illustrates an example concurrent beam management and CSI acquisition 2300 according to embodiments of the present disclosure. The embodiment of the concurrent beam management and CSI acquisition 2300 illustrated in FIG. 23 is for illustration only. FIG. 23 does not limit the scope of this disclosure to any particular implementation.

FIG. 23 illustrates an example for configuration and signaling of time-domain repetition of CSI-RS transmission according to the embodiment in this disclosure. In slot 2310, a UE is configured with CSI-RS resources and the time-domain repetition configuration for the CSI-RS transmission on those CSI-RS resources. The configuration information can be signaled in higher layers, e.g., RRC message. In slot 2320, a gNB can send a MAC-CE or L1 signaling to activate or trigger the CSI-RS transmission (e.g., multi-shot CSI-RS transmission, aperiodic CSI-RS transmission) and 1-bit field can be signaled in corresponding activation message or trigger message to indicate if the time-domain repetition is used in the corresponding CSI-RS transmission. The UE detects if time-domain repetition is used in the corresponding CSI-RS transmission in slot 2330. When the UE detects time-domain repetition is used in CSI-RS transmission in slot 2340, the UE can receive and measure the CSI-RS transmission by assuming the configured time-domain repetition method. In one example, the UE can sweep the Rx beam within CSI-RS transmission on one CSI-RS resource to refine the Rx beam. When the UE detects time-domain repetition is not used in the CSI-RS transmission in slot 2350, the UE can receive and measure the CSI-RS transmission by assuming the configured time-domain repetition is not used.

A CSI reporting setting for concurrent beam management and CSI acquisition can include one or more of the following components to configure the concurrent beam state information calculation/reporting and CSI calculation/reporting.

In one example, CSI reporting parameter setting is included, in such example, configure a UE to report CSI parameters that can include CRI reporting, RI (rank indicator), PMI (precoding matrix indicator), and CQI (channel quality indicator). In another example, the general setting information for CSI reporting is included. In such example, such as whether CSI reporting is periodic, semi-persistent, aperiodic, and can also include a slot configuration that provides a reference slot number and a slot periodicity for CSI reporting. In another example, CSI-RS resource group reporting parameter setting is included for beam management. In such example, configure a UE to report an index (or indices) of one or more CSI-RS resource group and the measurement of CSI-RS resource group metric. In one example, each CSI-RS resource configured by a RS setting can correspond to one Tx beam and each CSI-RS resource group can correspond to one group of Tx beams. The CSI-RS resource group metric can be the measurement over all the CSI-RS resources in one CSI-RS resource group. In one example, the CSI-RS resource group measurement metric can be mean RSRP or RSRQ of CSI-RS resources in a CSI-RS resource group.

In yet another example, the general setting information for CSI-RS resource group reporting is included. In such example, such as whether CSI-RS resource group reporting is periodic, semi-persistent, aperiodic, and can also include a slot configuration that provides a reference slot number and a slot periodicity for CSI-RS resource group reporting.

The slot periodicity for CSI reporting and CSI-RS resource group reporting can be different. In one example, the periodicity for CSI-RS resource group reporting can be larger than the slot periodicity for CSI reporting so that CSI-RS resource group reporting is reported with low duty cycle and CSI reporting is reported with high duty cycle. In such configuration, the CSI-RS resource group reporting can be used for beam management and concurrent beam management and CSI acquisition can be supported.

In one embodiment, some of CSI reporting parameters can also be configured to be reported with beam management related parameters. In one example, RI is also reported with CRI or CSI-RS resource group indication. In this example, the CSI reporting setting may (Alt 0) or may not (Alt 1) include RI. In Alt 0, the RI reported with CSI may or may not depend of the reported RI together with beam measurement related parameters. In Alt 1, the reported CSI assumes RI that is reported together with beam measurement related parameters.

In one embodiment, beam management and CSI acquisition for a UE can be operated concurrently. A UE can be configured with beam management and CSI acquisition together on the same pools of CSI-RS resources. The beam management operation can include the beam state information reporting and beam indication. The CSI acquisition operation can include CSI reporting.

FIG. 24 illustrates another example concurrent beam management and CSI acquisition 2400 according to embodiments of the present disclosure. The embodiment of the concurrent beam management and CSI acquisition 2400 illustrated in FIG. 24 is for illustration only. FIG. 24 does not limit the scope of this disclosure to any particular implementation.

In one example of concurrent beam management and CSI acquisition is illustrated in FIG. 24. In the example shown in FIG. 24, a UE is configured with K CSI-RS resources and S CSI-RS resource groups. The beam management is operated in slots 2421, 2422, and 2423. The CSI acquisition is operated in slots 1401-1410. The beam management operation in slots 2421, 2422, and 242 can include the beam state information reporting. In this example, the beam state information reporting can include one or more CSI-RS resource group index (or indices) and the corresponding CSI-RS resource group measurement metric. The beam management operation in slots 2421, 2422, and 2423 can include the beam indication operation.

In such example, the beam indication operation can be that the gNB indicates one CSI-RS resource group index to the UE. The CSI acquisition operation in slots 2401-2410 can include the CSI reporting of parameters CRI (CSI-RS resource index), PMI, RI and/or CQI. The UE is configured to use the CSI-RS resources in the CSI-RS resource group index reported and indicated in beam management operation of slot 2421 to calculate and report the CSI parameters for slots 2401-2404. Likewise, the UE is configured to use the CSI-RS resources in the CSI-RS resource group index reported and indicated in beam management operation of slot 2422 to calculate and report the CSI parameters for slots 2405-2408. The UE is configured to use the CSI-RS resources in the CSI-RS resource group index reported and indicated in beam management operation of slot 2423 to calculate and report the CSI parameters for slots 2409-2410.

The beam state information reporting parameters can include one or more of the following CSI-RS resource group measurement metric parameters. In one example, the beam state information reporting parameters can include a CSI-RS resource group index and a CSI-RS resource group's RSRP/RSRQ measurement. In such example, the group's RSRP/RSRQ can be defined as the RSRP/RSRQ of one CSI-RS resource that is formulated through aggregating all the CSI-RS resources contained in that CSI-RS group. In such example, the group's RSRP/RSRQ can be defined as the mean/median RSRP/RSRQ of all the CSI-RS resources contained in that CSI-RS resource group. In such example, the group's RSRP/RSRQ can be defined as a largest RSRP/RSRQ of all the CSI-RS resources contained in that CSI-RS resource group. In such example, the group's RSRP/RSRQ can be defined as the pair of a largest RSRP/RSRQ and a smallest RSRP/RSRQ of all the CSI-RS resources in that CSI-RS resource group. In such example, the group's RSRP/RSRQ can be defined as the pair of a largest RSRP/RSRQ and a mean/median RSRP/RSRQ of all the CSI-RS resources in that CSI-RS resource group.

In another example, the beam state information reporting parameters can include M CSI-RS resource group indices and the ordering information of those M reported CSI-RS resource group to indicate the relative CSI-RS resource group's RSRP/RSRQ measurement.

The CSI reporting can include CRI, PMI, RI and/or CQI. In one embodiment, a UE is configured to report on CSI-RS resource group index (can also report a CSI-RS resource's RSRP/RSRQ measurement) in slot 2421, 2422, and 2423. In slot 2421, the UE can report CSI-RS resource group index $i_1$. Then the UE can be requested to measure the CSI-RS transmission on CSI-RS resources contained in CSI-RS resource group $i_1$ and report the CSI reporting parameters in slot 2401-2404. In slot 2422, the UE can report CSI-RS resource group index $i_2$. Then the UE can be requested to measure the CSI-RS transmission on CSI-RS resources contained in CSI-RS resource group $i_2$ and report the CSI reporting parameters in slot 2405-2408. In slot 2423, the UE can report CSI-RS resource group index $i_3$. Then the UE can be requested to measure the CSI-RS transmission on CSI-RS resources contained in CSI-RS resource group $i_3$ and report the CSI reporting parameters in slot 2409-2410.

FIG. 25 illustrates yet another example concurrent beam management and CSI acquisition 2500 according to embodiments of the present disclosure. The embodiment of the concurrent beam management and CSI acquisition 2500 illustrated in FIG. 25 is for illustration only. FIG. 25 does not limit the scope of this disclosure to any particular implementation.

In one embodiment as illustrated in FIG. 25, a UE is configured to report M CSI-RS resource indices in slots 2421 and 2422. A network can indicate a UE with one CSI-RS resource index in slot 2501 and 2502. The UE can be requested to report the CSI that can be measured and calculated from the CSI-RS transmission in the CSI-RS resources contained in the indicated CSI-RS resource group. In slot 2421, the UE can report MCSI-RS resource indices $\{i_{1,1}, i_{1,2}, i_{1,M}\}$. Then a network can indicate the UE with one CSI-RS resource index $i_{1,m}$ in 2501, where $i_{1,m}$ can be selected from indices $\{i_{1,1}, i_{1,2}, i_{1,M}\}$ reported in slot 2421. The UE can be requested to measure the CSI-RS transmission on CSI-RS resources contained in CSI-RS resource group $i_{1,m}$ and report the CSI reporting parameters in slot 2401-2404. In slot 2422, the UE can report M CSI-RS resource indices $\{i_{2,1}, i_{2,2}, i_{2,M}\}$. Then a network can indicate the UE with one CSI-RS resource index $i_{2,m}$ in 2502, where $i_{2,m}$ can be selected from indices $\{i_{2,1}, i_{2,2}, i_{2,M}\}$ reported in slot 2422. The UE can be requested to measure the CSI-RS transmission on CSI-RS resources contained in CSI-RS resource group $i_{2,m}$ and report the CSI reporting parameters in slot 2405-2408.

In one embodiment, a UE can be indicated to dynamically switch between beam management and CSI acquisition operation. A UE can be configured with a RS setting that configures K CSI-RS resources and a CSI reporting setting that configures the CSI reporting parameters and beam state information reporting parameters. A UE can be indicated to switch dynamically between beam management and CSI reporting operation on the CSI-RS transmission on those K configured CSI-RS resources.

Figure 26:
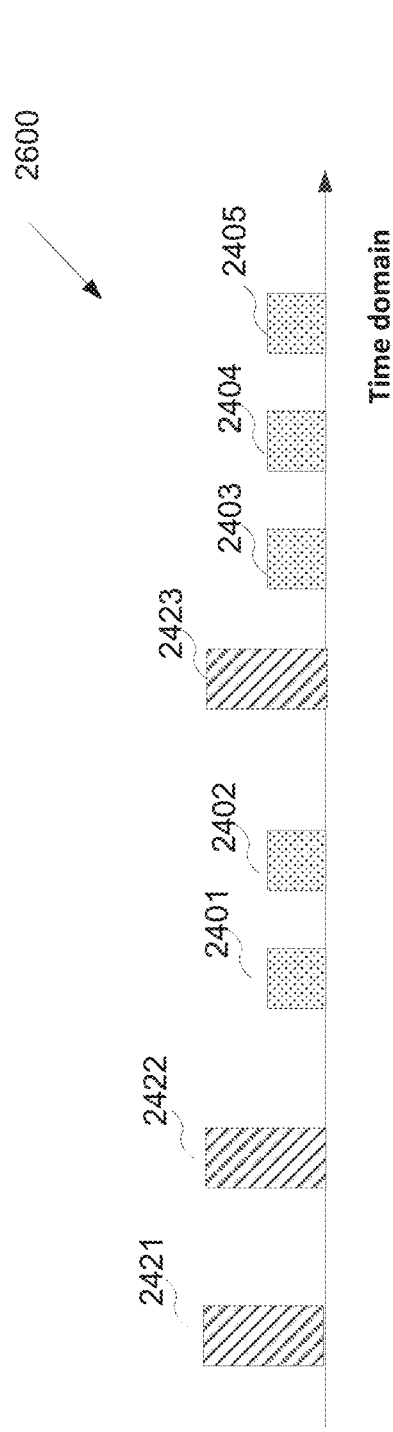
FIG. 26 illustrates yet another example concurrent beam management and CSI acquisition according to embodiments of the present disclosure.

FIG. 26 illustrates yet another example concurrent beam management and CSI acquisition 2600 according to embodiments of the present disclosure. The embodiment of the concurrent beam management and CSI acquisition 2600 illustrated in FIG. 26 is for illustration only. FIG. 26 does not limit the scope of this disclosure to any particular implementation.

In one example as illustrated in FIG. 26, a UE is indicated to operate beam management in slots 2421, 2422, and 2423 and to operate CSI acquisition in slots 2401, 2402, 2403, 2404, and 2405. The UE is indicated to operate beam management in slots 2421 and 2422. After slot 2422, the UE is indicated to switch to CSI acquisition. The UE can report the CSI reporting parameters in slots 2401 and 2402. After slot 2402, the UE is indicated switch to beam management and the UE reports beam state information parameters (e.g., CSI-RS resource group index (or indices) and/or RSRP/RSRQ of CSI-RS resource group) in slot 2423. After slot 2423, the UE is indicated to switch CSI acquisition and the UE can report CSI parameters (e.g., CRI, PMI, RI and/or CQI) in slots 2403, 2404, and 2405.

The dynamic switch indication can be signaled by a network to a UE through higher layers (e.g., RRC message), a MAC-CE and/or L1 signaling.

In semi-persistent CSI-RS transmission, K CSI-RS resources can be configured through RRC signaling. The CSI reporting parameter and beam management reporting parameters can be configure through RRC signaling. The gNB can activate the semi-persistent CSI-RS transmission on M CSI-RS resources (out of K configured resources). The activation message can indicate to the UE with beam management mode or CSI acquisition mode.

In one example, MAC CE can used to activate and/or deactivate the CSI-RS resources. Separate activation MAC CE and deactivation/release MAC CE can be used. The activation MAC CE can indicate a UE to operate beam management or CSI acquisition on the activated CSI-RS transmission. The activation MAC CE can indicate the UE to operate beam management and calculate and report beam state information on the activated CSI-RS transmission. The activation MAC CE can indicate the UE to operate CSI acquisition and calculate and report CSI on the activated CSI-RS transmission.

In another example, DCI (either UL-related or DL-related) transmitted over an L1 DL control signaling can be used to activate and/or deactivate the CSI-RS resources. Separate activation DCI and deactivation/release DCI can be used. Activation DCI can indicate a UE to operate beam management or CSI acquisition on the activated CSI-RS transmission.

In aperiodic CSI-RS transmission, the MAC CE or DCI transmitted over an L1 DL control signaling can be used to trigger CSI-RS transmission on K configured CSI-RS resources. The MAC CE or DCI trigger message can indicate a UE to operate beam management or CSI acquisition on the triggered CSI-RS transmission.

In periodic CSI-RS transmission, a MAC CE or DCL transmitted over an L1 DL control signaling can be used to indicate a UE to operate beam management or CSI acquisition. Upon receiving such a message, the UE can be requested to switch to the operation mode (beam management vs CSI acquisition) indicated in the corresponding message and the UE can be requested to operate in that indicated mode until new indication is received.

In one embodiment, a two-level CRI report can be configured to be reported with beam management related parameters. In one example a two-level CRI report can have CRI-1 and CRI-2. A UE can be requested to report one or more CSI-RS resource group index (or indices) in CRI-1 and to report one or more CSI-RS resource index (or indices) in CRI-2. The CSI-RS resource index (or indices) reported in CRI-2 can be related with the CSI-RS resource group index reported in CRI-1. In one example, one or more CSI-RS resource group index (or indices) can be reported in CRI-1 and the CSI-RS resource index (or indices) reported in CRI-2 can be the CSI-RS resources selected from one of the CSI-RS resource group reported in CRI-1.

Figure 27:
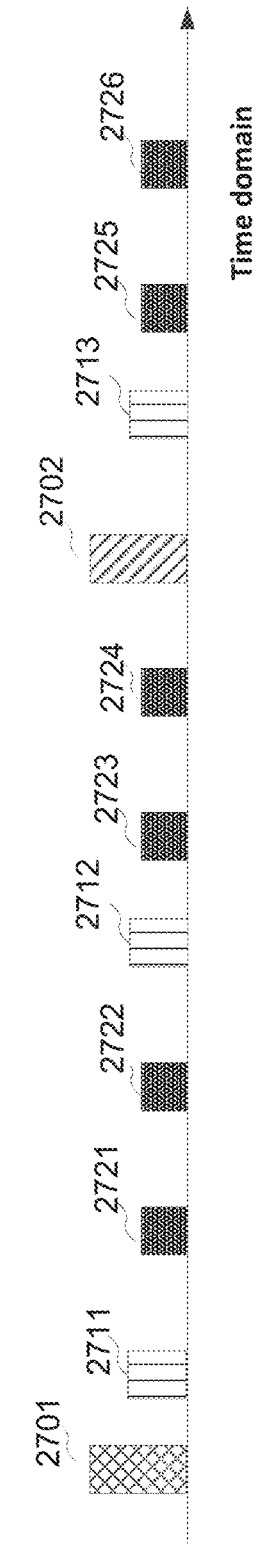
FIG. 27 illustrates yet another example concurrent beam management and CSI acquisition according to embodiments of the present disclosure.

FIG. 27 illustrates yet another example concurrent beam management and CSI acquisition 2700 according to embodiments of the present disclosure. The embodiment of the concurrent beam management and CSI acquisition 2700 illustrated in FIG. 27 is for illustration only. FIG. 27 does not limit the scope of this disclosure to any particular implementation.

A method of concurrent two-level CRI reporting for beam management and CSI acquisition is illustrated in FIG. 27. A UE is configured to report CRI-1 in slots 2701 and 2702. A UE is configured to report CRI-3 in slots 2711, 2712, and 2713. A UE is configured to report CSI in slots 2721, 2722, 2723, 2724, 2725, and 2726. In slot 2701, the UE can report one or more CSI-RS resource group index (or indices) in CRI-1. Then in slot 2711, the UE can report one or more CSI-RS resource index (or indices) in CRI-2, in which the CSI-RS resource(s) is selected from one or more of the CSI-RS resource group(s) reported in CRI-1 in slot 2701.

A network can indicate the CSI-RS resource group index to the UE before slot 2711 and the UE is requested to report one or more CSI-RS resource index (or indices) selected from the CSI-RS resource group reported in CRI-1 in slot 2701, in slot 2711. The UE is requested to report one or more CSI-RS resource index (or indices) selected from the CSI-RS resource group reported in CRI-1 in slot 2701, in slot 2712. The UE is requested to report CSI in slots 2721 and 2722 and the CSI is calculated from the CSI-RS transmission on CSI-RS resource(s) reported in slot 2711. If more than one CSI-RS resource indices are reported in CRI-2 in slot 2711, the network can indicate one CSI-RS resource index to the UE after slot 2711 and before slot 2721. In slots 2723 and 2724, the UE can be requested to report CSI measured from the CSI-RS transmission on CSI-RS resource(s) reported in CRI-2 in slot 2712. In slot 2702. The UE can be requested to report one or more CSI-RS resource index (or indices) in CRI-2 and the CSI-RS resources are selected from one or more CSI-RS resource groups reported in CRI-1 in slot 2702. The UE can be requested to report CSI calculated from the CSI-RS transmission on one or more CSI-RS resources reported in CRI-1 in 2713.

Figure 28:
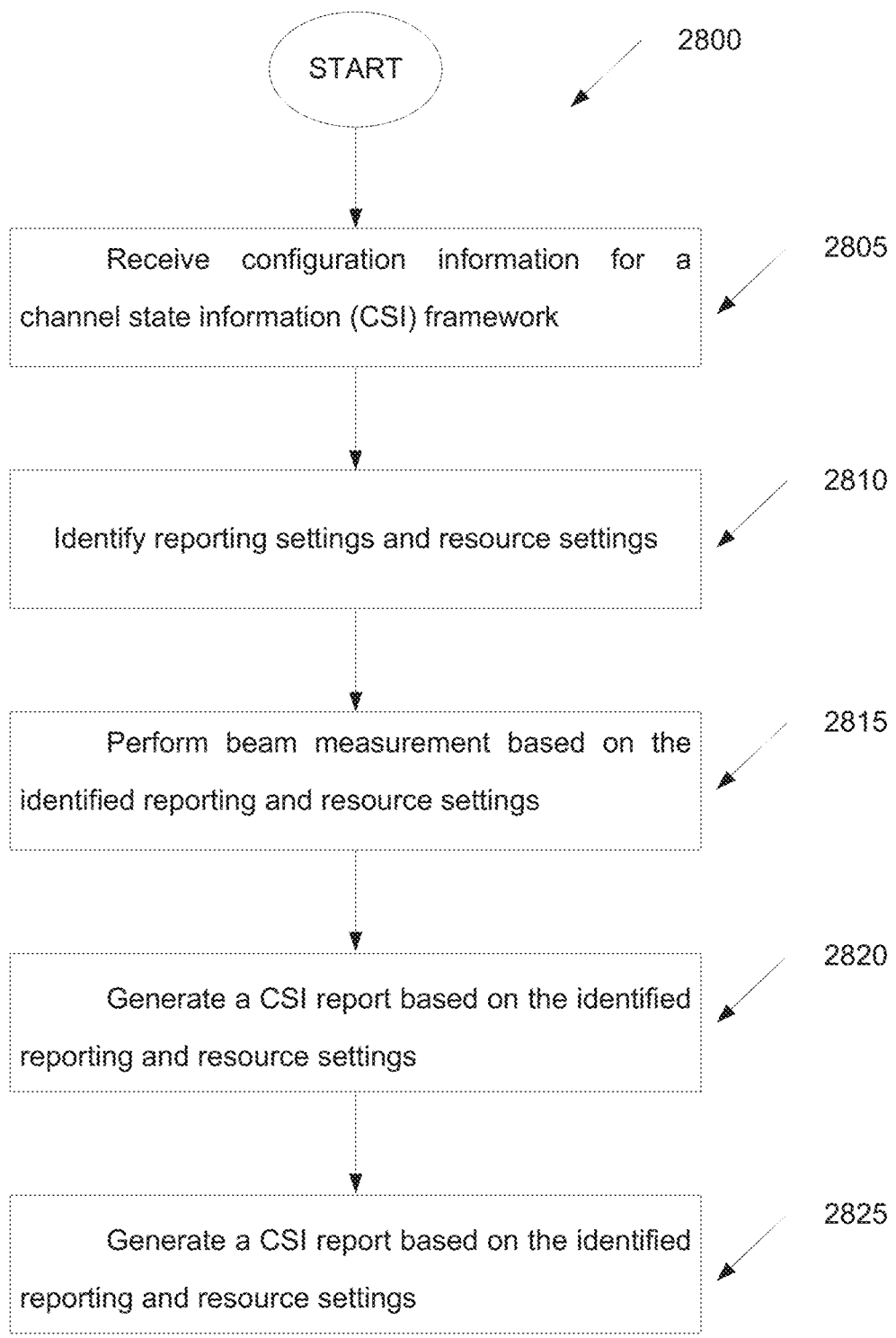
FIG. 28 illustrates a flow chart of a method for beam management and CSI acquisition according to embodiment of the present disclosure.

FIG. 28 illustrates a flow chart of a method 2800 for beam management and CSI acquisition according to embodiments of the present disclosure, as may be performed by a user equipment (UE). The embodiment of the method 2800 illustrated in FIG. 28 is for illustration only. FIG. 28 does not limit the scope of this disclosure to any particular implementation.

As shown in FIG. 28, the UE starts the method 2800 in step 2805. In step 2805, the UE receives configuration information for a CSI framework from a BS.

In step 2810, the UE identifies reporting settings and resource settings configured for the UE based on the received configuration information. In step 2810, the reporting settings configure a beam measurement and reporting configuration, the resource settings configure one or more RS resources for beam measurement, and each of the RS resources represents a Tx beam. In some embodiments, the reporting settings include a beam indicator information setting to configure the UE to report index information of selected CSI-RS resources and a beam quality information setting to configure the UE to report a RSRP of the selected CSI-RS resources. In some embodiment, the UE in step 2810 identifies a beam sweeping pattern based on the received configuration information.

In some embodiments, the UE in step 2810 further comprises determining whether to assume that the RS resources correspond to a same Tx beam based on an indicator in the received configuration information. In some embodiments, the reporting settings include a beam indicator information setting to configure the UE to report index information of one or more SS/PBCH blocks and a beam quality information setting to configure the UE to report a RSRP of the one or more SS/PBCH blocks. In some embodiment, the resource settings include a configuration of one or more synchronization signal SS/PBCH blocks for the UE to measure and report. In some embodiments, the reporting settings include a reporting indicator that indicates to the UE whether the UE does not need to report a measurement.

Subsequently, the UE in step 2815 performs beam measurement based on the identified reporting and resource settings. Next, the UE in step 2820 generates a CSI report based on the identified reporting and resource settings. Finally, the UE in step 2825 transmits the generated CSI report to the BS.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A terminal in a communication system, the terminal comprising:
   a transceiver; and
   a processor operably connected the transceiver, the processor configured to:
      receive channel state information (CSI) reporting configuration information and resource configuration information from a base station, the resource configuration information indicating a plurality of channel state information reference signal (CSI-RS) resources,
      identify a type of CSI reporting based on the CSI reporting configuration information, wherein the type of CSI reporting is identified from among a plurality of types of CSI reporting including reference signal received power (RSRP) reporting and none, and
      measure the CSI-RS resources based on the CSI reporting configuration information and the resource configuration information,
   wherein the CSI reporting is not performed in case that the type of CSI reporting is identified as none, and
   wherein the resource configuration information further includes a one bit indicator indicating whether the plurality of CSI-RS resources indicated by the resource configuration information correspond to a same transmission beam or do not correspond to a same transmission beam.

2. The terminal of claim 1, wherein a CSI-RS resource set is configured to include the plurality of CSI-RS resources based on the resource configuration information.

3. The terminal of claim 1, wherein the processor is further configured to:
   transmit CSI including beam state information to the base station, in case that the type of CSI reporting is configured as the RSRP reporting based on the CSI reporting configuration information.

4. The terminal of claim 3, wherein reported beam state information includes at least one of one or more CSI-RS resource indices or information on the RSRPs of the one or more CSI-RS resources.

5. A base station in a communication system, the base station comprising:
   a transceiver; and
   a processor operably connected to the transceiver, the processor configured to:
      transmit channel state information (CSI) reporting configuration information and resource configuration information to a terminal, the resource configuration information indicating a plurality of channel state information reference signal (CSI-RS) resources and the CSI reporting configuration information indicating a type of CSI reporting,
   wherein the type of CSI reporting is one among a plurality of types of CSI reporting including reference signal received power (RSRP) reporting and none,
   wherein the CSI-RS resources are associated with the CSI reporting configuration information and the resource configuration,
   wherein the CSI reporting is not received in case that a type of CSI reporting is none, and
   wherein the resource configuration information further includes a one bit indicator indicating whether the plurality of CSI-RS resources indicated by the resource configuration information correspond to a same transmission beam or do not correspond to a same transmission beam.

6. The base station of claim 5, wherein a CSI-RS resource set is configured to include the plurality of CSI-RS resources based on the resource configuration information.

7. The base station of claim 5, wherein the processor is further configured to:
   receive CSI including beam state information in case that the type of CSI reporting is configured as the RSRP reporting according to the CSI reporting configuration information.

8. The base station of claim 7, wherein reported beam state information includes at least one of one or more CSI-RS resource indices or information on the RSRPs of the one of more CSI-RS resources.

9. A method performed by a terminal in a communication system, the method comprising:
   receiving channel state information (CSI) reporting configuration information and resource configuration information from a base station, the resource configuration information indicating a plurality of channel state information reference signal (CSI-RS) resources;
   identifying a type of CSI reporting based on the CSI reporting configuration information, wherein the type of CSI reporting is identified from among a plurality of types of CSI reporting including reference signal received power (RSRP) reporting and none; and
   measuring the CSI-RS resources based on the CSI reporting configuration information and the resource configuration information,
   wherein the CSI reporting is not performed in case that the type of CSI reporting is identified as none, and
   wherein the resource configuration information further includes a one bit indicator indicating whether the plurality of CSI-RS resources indicated by the resource configuration information correspond to a same transmission beam or do not correspond to a same transmission beam.

10. The method of claim 9, wherein a CSI-RS resource set is configured to include the plurality of CSI-RS resources based on the resource configuration information.

11. The method of claim 9, further comprising:
    transmitting CSI including beam state information to the base station in case that the type of CSI reporting is configured as the RSRP reporting based on the CSI reporting configuration information.

12. The method of claim 11, wherein reported beam state information includes at least one of one or more CSI-RS resource indices or information on the RSRPs of the one or more CSI-RS resources.

13. A method performed by a base station in a communication system, the method comprising:
    transmitting channel state information (CSI) reporting configuration information and resource configuration information to a terminal, the resource configuration information indicating a plurality of channel state information reference signal (CSI-RS) resources and the CSI reporting configuration information indicating a type of CSI reporting, wherein the type of CSI reporting is one among a plurality of types of CSI reporting including reference signal received power (RSRP) reporting and none, wherein the CSI-RS resources are associated with the CSI reporting configuration information and the resource configuration, wherein the CSI reporting is not performed in case that a type of CSI reporting is none, and wherein the resource configuration information further includes a one bit indicator indicating whether the plurality of CSI-RS resources indicated by the resource configuration information correspond to a same transmission beam or do not correspond to a same transmission beam.

14. The method of claim 13, wherein a CSI-RS resource set is configured to include the plurality of CSI-RS resources based on the resource configuration information.

15. The method of claim 13, further comprising:
receiving CSI including beam state information from the terminal in case that the type of CSI reporting is configured as the RSRP reporting according to the CSI reporting configuration information.

16. The method of claim 15, wherein reported beam state information includes at least one of one or more CSI-RS resource indices or information on the RSRPs of the one or more CSI-RS resources.

* * * * *